United States Patent
Okamura et al.

(10) Patent No.: US 9,855,837 B2
(45) Date of Patent: Jan. 2, 2018

(54) WORK VEHICLE

(71) Applicant: YANMAR CO., LTD., Osaka (JP)

(72) Inventors: Yuusaku Okamura, Osaka (JP); Yoshiaki Kurokawa, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/785,754

(22) PCT Filed: Apr. 17, 2014

(86) PCT No.: PCT/JP2014/060967
§ 371 (c)(1),
(2) Date: Oct. 20, 2015

(87) PCT Pub. No.: WO2014/175168
PCT Pub. Date: Oct. 30, 2014

(65) Prior Publication Data
US 2016/0082830 A1 Mar. 24, 2016

(30) Foreign Application Priority Data

Apr. 26, 2013 (JP) .................................. 2013-093914
May 24, 2013 (JP) .................................. 2013-110261

(51) Int. Cl.
*B60K 13/04* (2006.01)
*F01N 3/20* (2006.01)
(Continued)

(52) U.S. Cl.
CPC .......... *B60K 13/04* (2013.01); *B62D 33/0617* (2013.01); *F01N 3/103* (2013.01);
(Continued)

(58) Field of Classification Search
CPC ...... B60K 13/04; E02F 9/0883; F01N 3/2066; F01N 13/1805; F01N 2590/08
See application file for complete search history.

(56) References Cited

U.S. PATENT DOCUMENTS 8,739,918 B2 * 6/2014 Mariner .................. F01N 13/08
180/309
9,267,267 B1 * 2/2016 Kamimae .............. B60K 13/02
(Continued)

FOREIGN PATENT DOCUMENTS

JP 2004-351963 A 12/2004
JP 2008-087490 A 4/2008
(Continued)

*Primary Examiner* — Brian L Swenson
(74) *Attorney, Agent, or Firm* — Norris McLaughlin & Marcus, P.A.

(57) ABSTRACT

Provided is a work vehicle that can easily reduce the manufacturing cost by downsizing and simplifying a case support body and can easily simplify a support structure for a second case. The work vehicle includes an operation unit for an operator to get in, a first case for removing particulate matter in exhaust gas from the engine, and the second case for removing nitrogen oxides in the exhaust gas from the engine. In addition, the work vehicle includes a traveling machine body frame on which the operation unit is mounted, and the case support body for supporting the second case. The case support body is disposed on the traveling machine body frame, and the second case is attached to the traveling machine body frame via the case support body.

12 Claims, 15 Drawing Sheets

(51) Int. Cl.
*F01N 13/18* (2010.01)
*B62D 33/06* (2006.01)
*F01N 3/10* (2006.01)
*E02F 9/08* (2006.01)

(52) U.S. Cl.
CPC ....... *F01N 3/2066* (2013.01); *F01N 13/1805* (2013.01); *B60Y 2200/221* (2013.01); *E02F 9/0866* (2013.01); *E02F 9/0883* (2013.01); *F01N 2590/08* (2013.01); *F01N 2610/02* (2013.01); *F01N 2610/1406* (2013.01); *Y02T 10/24* (2013.01)

(56) References Cited

U.S. PATENT DOCUMENTS

| | | | | |
|---|---|---|---|---|
| 2007/0169452 | A1* | 7/2007 | Grimm | B01D 46/001 55/523 |
| 2008/0168764 | A1* | 7/2008 | Recker | F01N 3/035 60/297 |
| 2011/0180344 | A1* | 7/2011 | Kimura | B60K 13/04 180/309 |
| 2011/0239636 | A1* | 10/2011 | Brunet | F01N 3/021 60/320 |
| 2011/0283687 | A1* | 11/2011 | Dobler | F01N 13/1805 60/299 |
| 2012/0012733 | A1* | 1/2012 | Fowler | B60K 13/04 248/674 |
| 2012/0042637 | A1* | 2/2012 | Roozenboom | F01N 3/035 60/297 |
| 2012/0124979 | A1* | 5/2012 | Noma | B66F 9/07595 60/311 |
| 2013/0213726 | A1 | 8/2013 | Okada | |

FOREIGN PATENT DOCUMENTS

| | | |
|---|---|---|
| JP | 2009-074420 | 4/2009 |
| JP | 2010-083331 | 4/2010 |
| JP | 2010-215118 | 9/2010 |
| JP | 2011-156948 A | 8/2011 |
| JP | 2011-230638 A | 11/2011 |
| JP | 2011-231618 | 11/2011 |
| JP | 2011-247231 | 12/2011 |
| JP | 2012-097413 | 5/2012 |
| JP | 2012-215022 | 11/2012 |
| JP | 2012-219624 | 11/2012 |
| JP | 2013-039913 A | 2/2013 |
| JP | 2014-214697 A | 11/2014 |

* cited by examiner

WORK VEHICLE

TECHNICAL FIELD

The present invention relates to a work vehicle such as an agricultural machine (tractor or combine) or a construction machine (bulldozer, hydraulic shovel, or loader) equipped with an engine. More specifically, the present invention relates to a work vehicle such as a tractor equipped with an exhaust gas purification device for removing particulate matter (such as soot) contained in exhaust gas or nitrogen oxides (NOx) or the like contained in exhaust gas.

BACKGROUND OF THE INVENTION

In a work vehicle such as a tractor or a wheel loader, in order to improve efficiency of maintenance of an engine disposed in a front part of a traveling machine body, an open/close pivot axis is disposed at a rear part of an engine hood covering the engine so that the engine hood can swing about the open/close pivot axis. In addition, there is known a method for purifying exhaust gas discharged from a diesel engine by disposing a filter case housing a diesel particulate filter as the exhaust gas purification device (an exhaust gas post-processing device) in an exhaust gas path of the diesel engine and a catalyst case housing a urea selective reduction catalyst, and by introducing the exhaust gas into the filter case and the catalyst case (see, for example, Patent Document 1 or 2).

PRIOR ART DOCUMENTS

Patent Document 1: JP-A-2009-74420
Patent Document 2: U.S. Patent application publication No. 2011/283687

When the catalyst case is assembled separate from the engine as described in Patent Document 2, because an exhaust gas pipe for supplying the exhaust gas from the engine to the catalyst case is constituted of a support member for making the traveling machine body to support the catalyst case, it is necessary to form the support member to have a special structure, and hence there is a problem that it is not easy to reduce the manufacturing cost. In addition, when the support member is assembled to the traveling machine body in a cantilever manner, it is necessary to support the catalyst case or the support member in a vibration isolation manner, and hence there is a problem that a mounting structure for the catalyst case or the support member cannot be easily simplified.

Accordingly, it is an object of the present invention to provide an improved work vehicle in view of the above-mentioned circumstances.

SUMMARY OF THE INVENTION

In order to achieve the above-mentioned object, the work vehicle according to the invention includes an operation unit for an operator to get in, a first case for removing particulate matter in exhaust gas from an engine, a second case for removing nitrogen oxides in the exhaust gas from the engine, a traveling machine body frame on which the operation unit is mounted, and a case support body for supporting the second case. The case support body is disposed in the traveling machine body frame, and the second case is attached to the traveling machine body frame via the case support body.

The work vehicle according to the invention is configured, in the work vehicle according to the invention, in such a manner that the operation unit for an operator to get in is formed as a cabin mounted on the traveling machine body frame, a lower part of the second case elongated vertically is attached to the traveling machine body frame via the case support body, and an upper part of the second case elongated vertically is connected to a front corner frame of the cabin.

The work vehicle according to the invention is configured, in the work vehicle according to the invention, in such a manner that the operation unit is disposed behind an engine hood in which the engine is disposed, the work vehicle includes a urea water tank for purifying the exhaust gas and a urea mixing pipe for supplying urea water from the urea water tank, an exhaust gas inlet of the second case is connected to an exhaust gas outlet of the first case via the urea mixing pipe, and the urea water tank is disposed between a steering wheel portion of the operation unit and the engine.

The work vehicle according to the invention is configured, in the work vehicle according to the invention, in such a manner that the urea mixing pipe is disposed to extend in a direction crossing an exhaust gas moving direction of the first case between a rear part of the engine and a front part of the urea water tank.

The work vehicle according to the invention includes, in the work vehicle according to the invention, a urea water tank for purifying the exhaust gas and a urea mixing pipe for supplying urea water from the urea water tank, in which an exhaust gas inlet of the second case is connected to an exhaust gas outlet of the first case via the urea mixing pipe, the first case is supported by an upper part of the engine, and the urea mixing pipe is disposed to extend in parallel to an exhaust gas moving direction of the first case.

The work vehicle according to the invention is configured, in the work vehicle according to the invention, in such a manner that the case support body is disposed on a step frame of an operation unit lower surface side on one side of the traveling machine body in a lower surface side of the operation unit mounted on the traveling machine body, and the second case is attached to the operation unit lower surface side via the case support body in a horizontally elongated shape.

The work vehicle according to the invention is configured, in the work vehicle according to the invention, in such a manner that the second case is attached to the operation unit lower surface side via the case support body in a horizontally elongated shape along a front end side of the boarding step.

The work vehicle according to the invention is configured, in the work vehicle according to the invention, in such a manner that the second case is attached via the case support body between one side surface of the traveling machine body and up/down steps below the boarding step on the operation unit lower surface side.

The work vehicle according to the invention includes, in the work vehicle according to the invention, a urea water tank for purifying the exhaust gas and a urea mixing pipe for supplying urea water from the urea water tank, in which an exhaust gas inlet of the second case is connected to an exhaust gas outlet of the first case via the urea mixing pipe, the first case is supported by an upper surface side of the engine, and the urea mixing pipe is disposed to extend in parallel to an exhaust gas moving direction of the first case.

The work vehicle according to the invention is configured, in the work vehicle according to the invention, in such a manner that right and left engine frames are disposed to extend frontward from the engine, a radiator or front wheels are arranged in the right and left engine frames, and the urea water tank is attached between the right and left engine frames.

According to the work vehicle of the invention, the work vehicle includes an operation unit for an operator to get in, a first case for removing particulate matter in exhaust gas from an engine, a second case for removing nitrogen oxides in the exhaust gas from the engine, a traveling machine body frame on which the operation unit is mounted, and a case support body for supporting the second case, in which the case support body is disposed in the traveling machine body frame, and the second case is attached to the traveling machine body frame via the case support body. As a result, the case support body can be disposed in the traveling machine body frame having high stiffness, and the manufacturing cost can be easily reduced by downsizing and simplifying the case support body. Further, support stiffness of the second case can be easily improved, and workability of assembling the second case can be easily improved. In addition, compared with a conventional structure in which the second case is supported by using the exhaust gas pipe, a second case support structure can be easily simplified.

According to the work vehicle of the invention, the operation unit for an operator to get in is formed as a cabin mounted on the traveling machine body frame, a lower part of the second case elongated vertically is attached to the traveling machine body frame via the case support body, and an upper part of the second case elongated vertically is connected to a front corner frame of the cabin. As a result, the lower part of the second case can be placed and fixed onto the case support body so that workability of assembling the relatively heavy second case can be improved, and lateral swing of the second case can be easily prevented by connection between the front corner frame of the cabin and the upper part of the second case. Thus, an outer shape of the second case can be compactly formed to be a vertically elongated cylindrical shape that can be easily along the front corner frame of the cabin.

According to the work vehicle of the invention, the operation unit is disposed behind an engine hood in which the engine is disposed, the work vehicle includes a urea water tank for purifying the exhaust gas and a urea mixing pipe for supplying urea water from the urea water tank, an exhaust gas inlet of the second case is connected to an exhaust gas outlet of the first case via the urea mixing pipe, and the urea water tank is disposed between a steering wheel portion of the operation unit and the engine. As a result, it is possible to prevent heat or vibration generated on the engine side from propagating to the operation unit side. In addition, because the urea water tank is heated by heat of the engine side, temperature of urea water solution in the urea water tank can be easily sustained so that crystallization of the urea water can be reduced even if the work is performed in a cold. Further, because it is necessary to separate between the operation unit and the engine, the urea water tank can be utilized effectively as a partition member. Thus, a separation structure between the operation unit and the engine can be simplified, and the urea water tank can be compactly disposed inside the engine hood (engine room).

According to the work vehicle of the invention, because the urea mixing pipe is disposed to extend in the direction crossing the exhaust gas moving direction of the first case between the rear part of the engine and the front part of the urea water tank, the urea mixing pipe can be compactly disposed between the rear part of the engine and the front part of the urea water tank. Further, because the urea mixing pipe is heated by heat of the engine side, temperature of urea water solution in the urea mixing pipe can be easily sustained so that crystallization of the urea water can be reduced even if the work is performed in a cold.

According to the work vehicle of the invention, the work vehicle includes the urea water tank for purifying the exhaust gas and the urea mixing pipe for supplying urea water from the urea water tank, in which an exhaust gas inlet of the second case is connected to an exhaust gas outlet of the first case via the urea mixing pipe, the first case is supported by an upper part of the engine, and the urea mixing pipe is disposed to extend in parallel to an exhaust gas moving direction of the first case. As a result, the urea mixing pipe is heated by heat of the engine side or the first case side, so that crystallization of the urea water in the urea mixing pipe can be reduced. Further, a length of a heated part of the urea mixing pipe heated by heat of the engine can be equal to or longer than the length necessary for mixing the urea water as ammonia with the exhaust gas, so that an exhaust gas purifying function of removing nitrogen oxides in the exhaust gas in the second case can be improved.

According to the work vehicle the invention, the case support body is disposed on a step frame of an operation unit lower surface side on one side of the traveling machine body in a lower surface side of the operation unit mounted on the traveling machine body, and the second case is attached to the operation unit lower surface side via the case support body in a horizontally elongated shape. As a result, the case support body can be disposed on the step frame having high stiffness, and manufacturing cost can be easily reduced by downsizing and simplifying the case support body. In addition, support stiffness of the second case can be easily improved, and workability of assembling the second case can be also easily improved.

According to the work vehicle of the invention, because the second case is attached to the operation unit lower surface side via the case support body in a horizontally elongated shape along a front end side of the boarding step, the second case can be compactly disposed while securing a front field of vision of an operator in the operation unit. In addition, compared with a conventional structure in which the second case is supported by using the exhaust gas pipe, a second case support structure can be easily simplified.

According to the work vehicle of the invention, because the second case is attached via the case support body between one side surface of the traveling machine body and up/down steps below the boarding step on the operation unit lower surface side, a machine outer side of the second case can be protected by the up/down steps, and the second case can be compactly disposed by utilizing the space between the side surface of the traveling machine body and the up/down steps.

According to the work vehicle of the invention, the work vehicle includes the urea water tank for purifying the exhaust gas and the urea mixing pipe for supplying urea water from the urea water tank, in which an exhaust gas inlet of the second case is connected to an exhaust gas outlet of the first case via the urea mixing pipe, the first case is supported by an upper surface side of the engine, and the urea mixing pipe is disposed to extend in parallel to an exhaust gas moving direction of the first case. As a result, the elongated urea mixing pipe necessary for mixing the urea water can be compactly disposed on an upper surface part of the engine. In addition, because the urea mixing pipe is heated by heat of the engine side, temperature of the exhaust gas or the urea water solution in the urea mixing pipe can be easily sustained so that crystallization of the urea water in the urea mixing pipe can be reduced even if the work is performed in a cold.

According to the work vehicle of the invention, right and left engine frames are disposed to extend frontward from the engine, a radiator or front wheels are arranged in the right and left engine frames, and the urea water tank is attached between the right and left engine frames. As a result, the urea water tank can be easily assembled by utilizing the space between the right and left engine frames, and the urea water tank can be compactly disposed inside the engine hood (engine room) for covering the engine.

DESCRIPTION OF THE PREFERRED EMBODIMENTS

Figure 1:
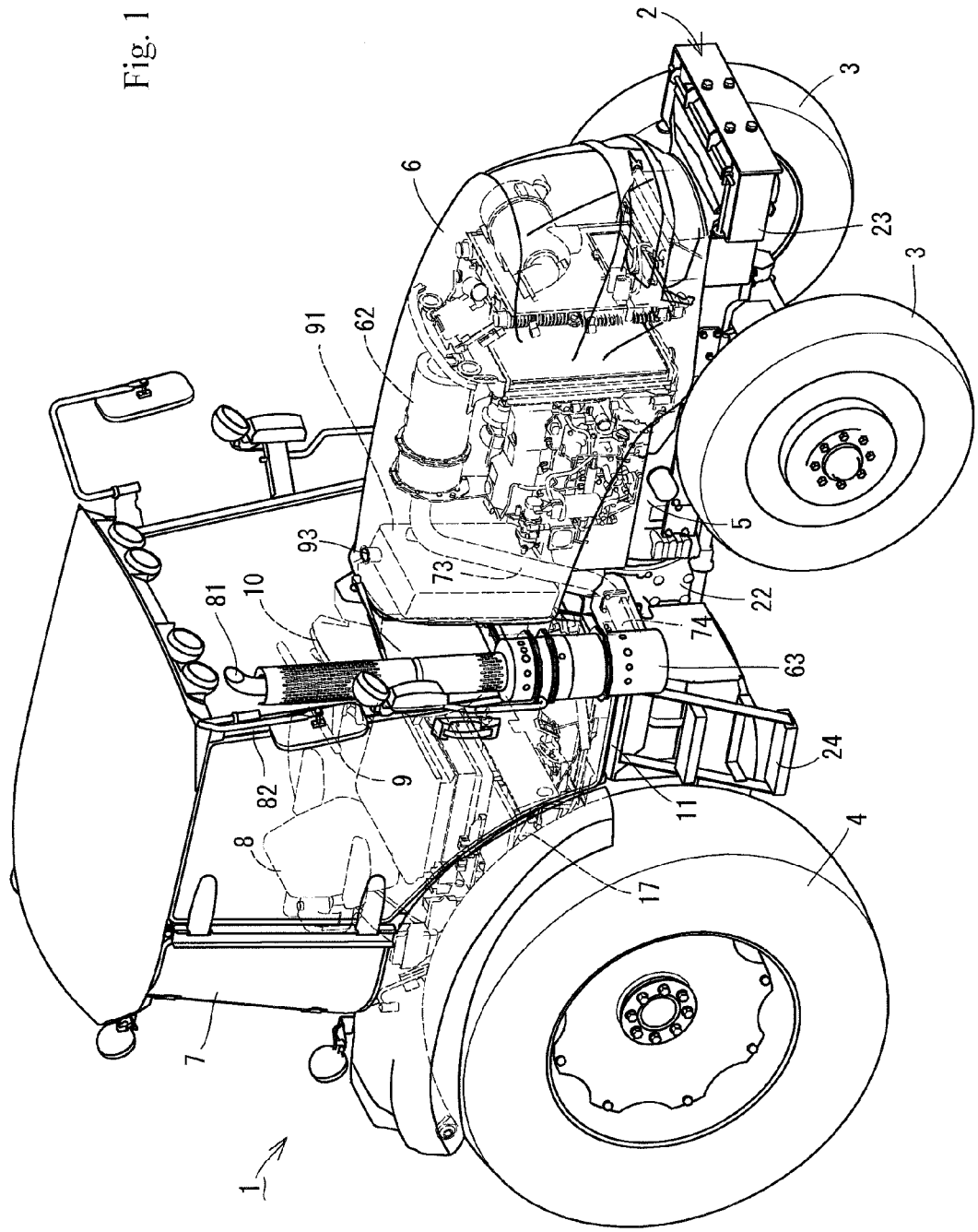
FIG. 1 is a perspective view of a tractor showing a first embodiment.
Figure 2:
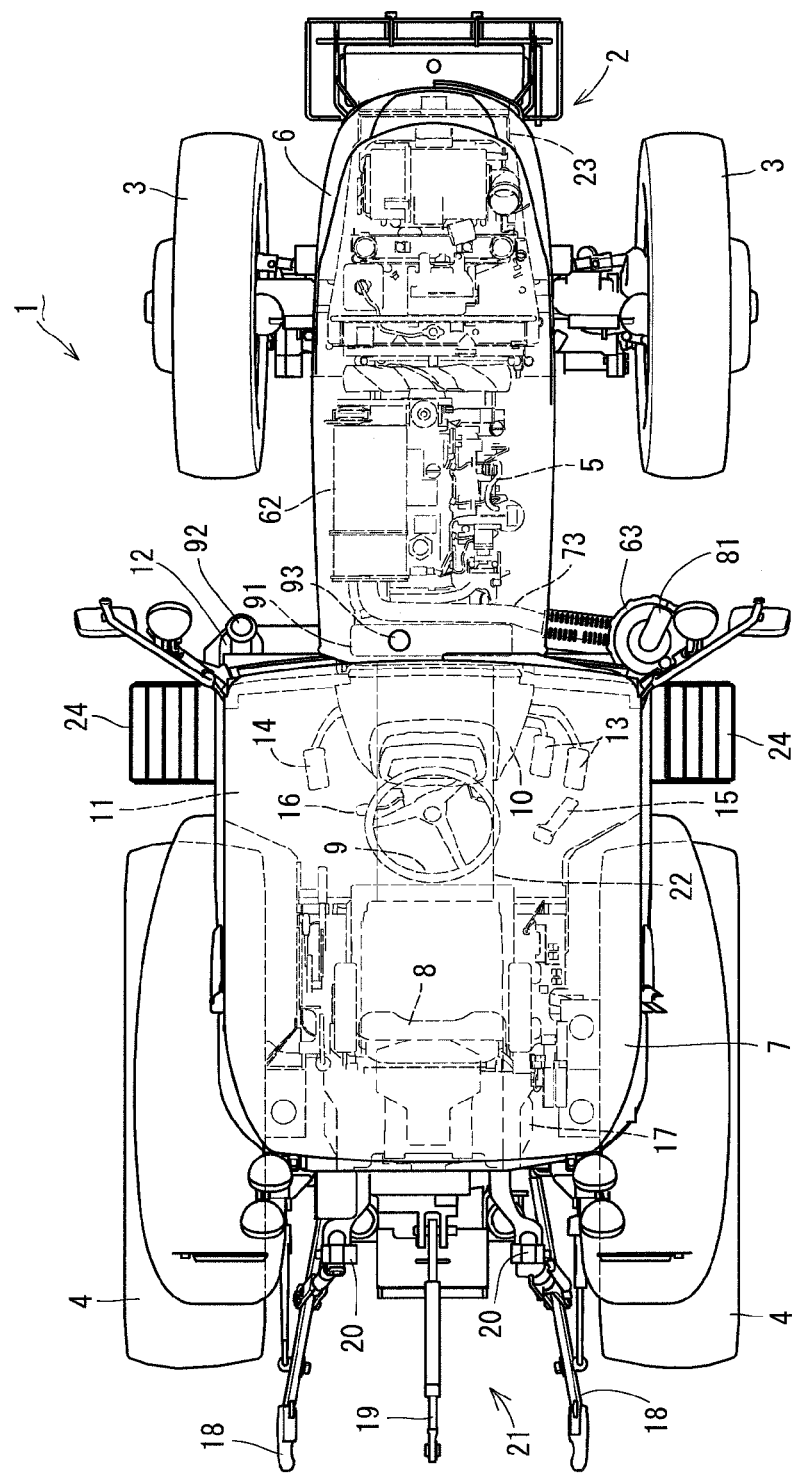
FIG. 2 is a plan view of the tractor.

Hereinafter, a first embodiment in which the present invention is embodied is described with reference to the drawings (FIGS. 1 to 6). First, with reference to FIGS. 1 and 2, a tractor 1 for agricultural work equipped with a diesel engine is described. The tractor 1 for agricultural work as a work vehicle shown in FIGS. 1 and 2 is configured to be mounted with a cultivator implement or the like (not shown) for performing cultivating work or the like for cultivating a field. FIG. 1 is a perspective view of the tractor 1, and FIG. 2 is a plan view of the tractor 1. Further, in the following description, a left side in the forward direction of the tractor 1 is simply referred to as a left side, and similarly, a right side in the forward direction is simply referred to as a right side.

As shown in FIGS. 1 and 2, the tractor 1 for agricultural work as a work vehicle has a structure in which a traveling machine body 2 is supported by a pair of right and left front wheels 3 and a pair of right and left rear wheels 4, a diesel engine 5 is mounted in a front part of the traveling machine body 2, and the diesel engine 5 drives the rear wheels 4 and the front wheels 3 so that the tractor 1 moves forward and backward. An upper surface side and right and left surface sides of the diesel engine 5 are covered with an engine hood 6 that is openable and closable.

In addition, a cabin 7 as an operation unit for an operator to get in is disposed on the upper surface of the traveling machine body 2 behind the engine hood 6. Inside the cabin 7, there are disposed a driving seat 8 for the operator to sit in, and a front column 10 equipped with a steering wheel 9 as steering means and the like. In addition, a fuel tank 12 for supplying fuel to the diesel engine 5 is disposed below a boarding step 11 in a bottom part of the cabin 7. Note that the front column 10 is equipped with right and left brake pedals 13, a clutch pedal 14, a gear shift pedal 15, a forward-reverse switching lever 16, and the like as control equipment.

In addition, the traveling machine body 2 is provided with a mission case 17 for shifting power output from the diesel engine 5 and transmitting the power to the rear wheels 4 (front wheels 3). A rear part of the mission case 17 is connected to cultivator implement or the like (not shown) via a traction mechanism 21 such as right and left lower links 18, a top link 19, right and left lift arms 20, and the like, and a PTO shaft (not shown) provided to a rear side surface of the mission case 17 drives the cultivator implement or the like. Further, the traveling machine body 2 of the tractor 1 includes the diesel engine 5, the mission case 17, a clutch case 22 for connecting them, a front chassis 23 extending frontward from the diesel engine 5. Note that right and left up/down steps 24 for the operator to walk up and down are disposed at right and left outside parts of the cabin 7.

Figure 3:
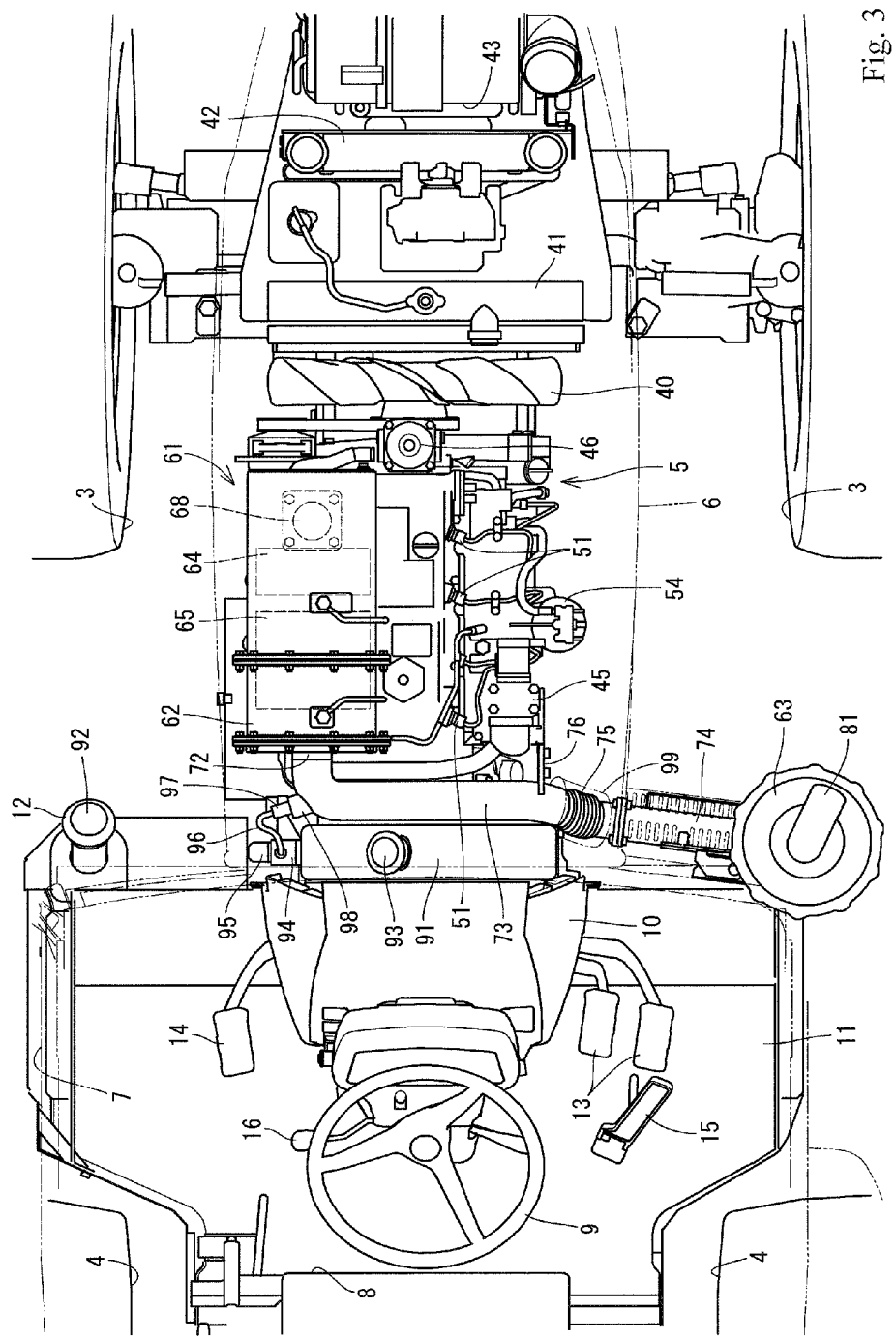
FIG. 3 is a plan view of an engine portion.
Figure 4:
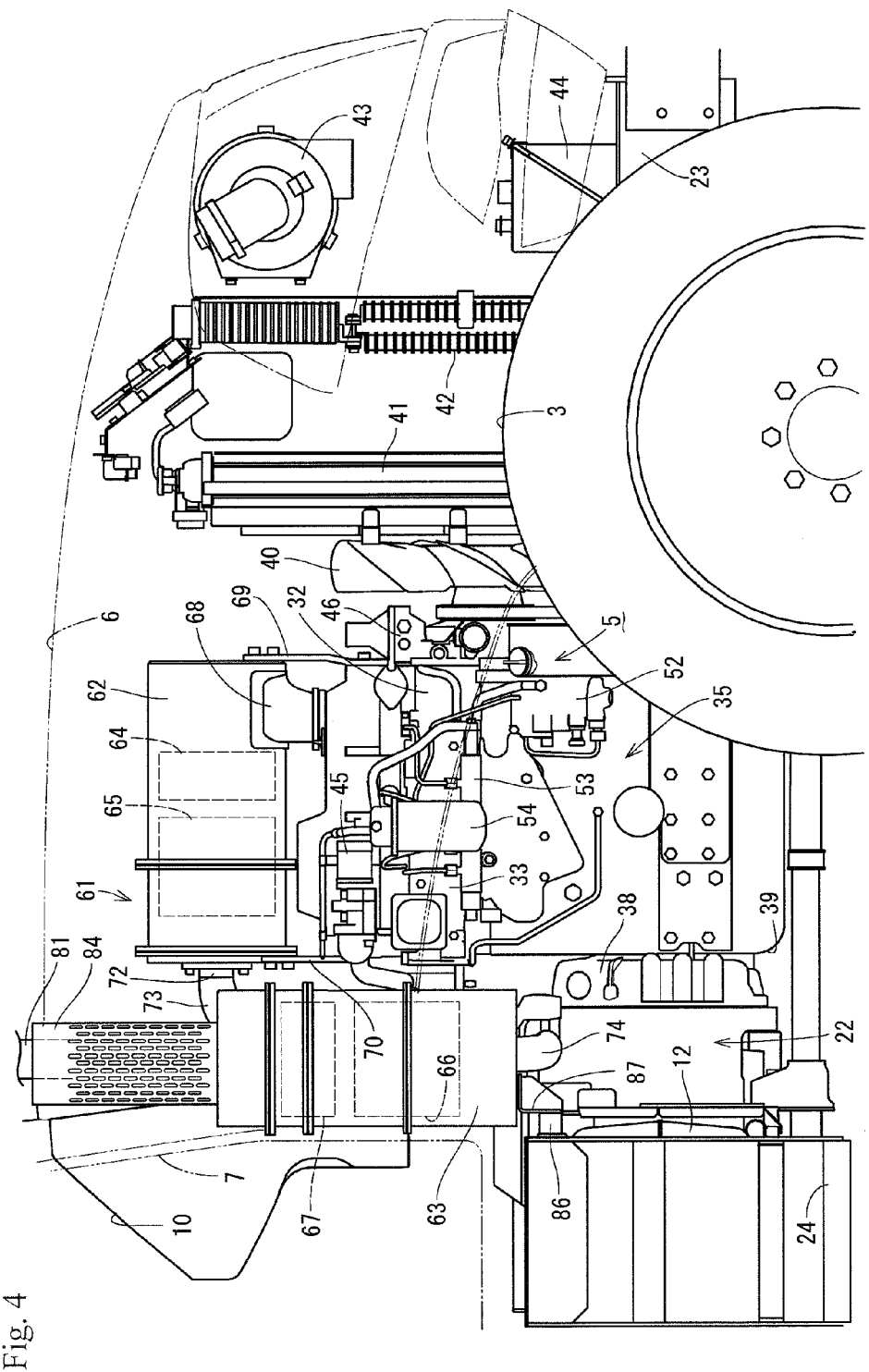
FIG. 4 is a right side view of the engine portion.
Figure 5:
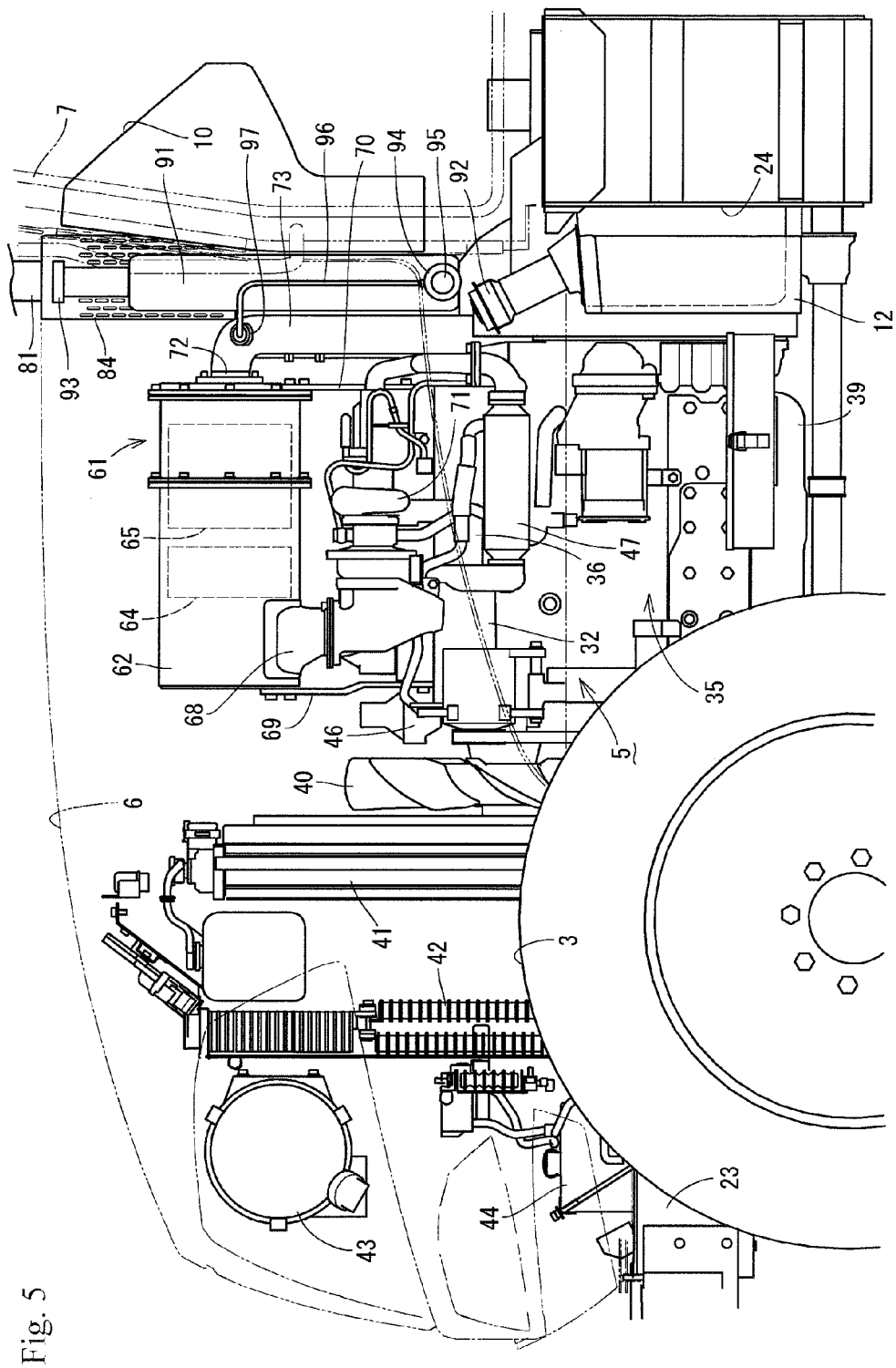
FIG. 5 is a left side view of the engine portion.

Next, with reference to FIGS. 3 to 5, the diesel engine 5 is described. As shown in FIGS. 3 to 5, an intake manifold 33 is disposed on one side surface of a cylinder head 32 of the diesel engine 1. The cylinder head 32 is disposed on a cylinder block 35 in which an engine output shaft (crank shaft) and a piston (that are not shown) are disposed. An exhaust manifold 36 is disposed on the other side surface of the cylinder head 32, and front and rear ends of the engine output shaft are protruded from front and rear surfaces of the cylinder block 35.

As shown in FIGS. 3 to 5, a flywheel housing 38 is fixed to a rear surface of the cylinder block 35. A flywheel (not shown) is disposed in the flywheel housing 38. A front surface side of the clutch case 22 is connected to a rear surface side of the flywheel housing 38. A power of the diesel engine 5 is transmitted to the mission case 17 from the rear end side of the engine output shaft to which the flywheel is connected. Further, an oil pan 39 is disposed on the under surface of the cylinder block 35, a cooling fan 40 is disposed on a front surface side of the cylinder block 35, and a radiator 41 is disposed to face the cooling fan 40. An oil cooler 42, an air cleaner 43, a battery 44, and the like are disposed on the front chassis 23 in front of the radiator 41.

As shown in FIGS. 3 to 5, the intake manifold 33 is equipped with an exhaust gas recirculation device (EGR) 45 for taking in exhaust gas to be recirculated. The air cleaner 43 shown in FIG. 4 is connected to the intake manifold 33. External air cleaned and purified by the air cleaner 43 is sent to the intake manifold 33 and is supplied to each cylinder of the diesel engine 5.

With the structure described above, a part of exhaust gas discharged from the diesel engine 5 to the exhaust manifold 36 returns to each cylinder of the diesel engine 5 from the intake manifold 33 via the exhaust gas recirculation device 45. Thus, combustion temperature of the diesel engine 5 is lowered, an emission amount of nitrogen oxides (NOx) from the diesel engine 5 is reduced, and fuel efficiency of the diesel engine 5 can be improved.

Note that there is disposed a cooling water pump 46 for circulating cooling water in the cylinder block 35 and the radiator 41. The cooling water pump 46 is disposed on the front surface side of the diesel engine 5 on the side where the cooling fan 40 is disposed. The cooling water pump 46 and the cooling fan 40 are connected to the engine output shaft of the diesel engine 5 via a V belt or the like so that the cooling water pump 46 and the cooling fan 40 are driven. The cooling water pump 46 sends the cooling water into the cylinder block 35 via an EGR cooler 47 of the exhaust gas recirculation device 45 while air from the cooling fan 40 cools the diesel engine 5.

As shown in FIG. 4, each of injectors 51 for four cylinders of the diesel engine 5 is equipped with a common rail 53 and a fuel pump 52 connected to the fuel tank 12 shown in FIG. 4. The common rail 53 and a fuel filter 54 are disposed on the cylinder head 32 on the side where the intake manifold 33 is disposed, and the fuel pump 52 is disposed on the cylinder block 35 below the intake manifold 33. Note that each of the injectors 51 includes an electromagnetic switching control type fuel injection valve (not shown).

The fuel in the fuel tank 12 is sucked into the fuel pump 52 via the fuel filter 54, while a discharge side of the fuel pump 52 is connected to the common rail 53, and the cylindrical common rail 53 is connected to each of the injectors 51 of the diesel engine 5. Note that excess fuel sent by pressure from the fuel pump 52 to the common rail 53 returns to the fuel tank 12, and the high pressure fuel is temporarily stored in the common rail 53, so that the high pressure fuel in the common rail 53 is supplied into each of the cylinders of the diesel engine 5.

With the structure described above, the fuel in the fuel tank 12 is sent by pressure to the common rail 53 by the fuel pump 52 so that the high pressure fuel is stored in the common rail 53, and the fuel injection valve of each injector 51 is controlled to open and close so that the high pressure fuel in the common rail 53 is injected into each cylinder of the diesel engine 5. In other words, the fuel injection valve of each injector 51 is electronically controlled so that fuel injection pressure, injection timing, and injection period (injection amount) can be controlled with high accuracy. As a result, nitrogen oxides (NOx) discharged from the diesel engine 5 can be reduced.

As shown in FIGS. 3 to 6, as an exhaust gas purification device 61 for purifying the exhaust gas discharged from each cylinder of the diesel engine 5, there are disposed a first case 62 as a diesel particulate filter (DPF) for removing particulate matter in the exhaust gas from the diesel engine 5 and a second case 63 as a urea selective catalyst reduction (SCR) system for removing nitrogen oxides in the exhaust gas from the diesel engine 1. As shown in FIG. 4, an oxidation catalyst 64 and a soot filter 65 are disposed in the first case 62. An SCR catalyst 66 for the urea selective catalyst reduction and an oxidation catalyst 67 are disposed in the second case 63.

The exhaust gas discharged from each cylinder of the diesel engine 5 to the exhaust manifold 36 is discharged to the outside via the exhaust gas purification device 61 and the like. The exhaust gas purification device 61 reduces carbon monoxide (CO), hydrocarbon (HC), particulate matter (PM), and nitrogen oxides (NOx) in the exhaust gas from the diesel engine 5.

The first case 62 is formed in a cylindrical shape elongated laterally in a direction parallel to the output shaft (crank shaft) of the diesel engine 5 in a plan view. A DPF inlet pipe 68 for taking in the exhaust gas is disposed on one end side of the cylindrical shape of the first case 62. In the front and rear surfaces of the diesel engine 5, one end side and the other end side of the first case 62 in the exhaust gas moving direction are supported in an attachable and detachable manner to the front and rear surfaces of the cylinder head 32 via a front support leg 69 and a rear support leg 70. In other words, the first case 62 is attached to the upper surface side of the diesel engine 5 via the front support leg 69 and the rear support leg 70. The cylindrical first case 62 is supported in parallel to the exhaust manifold 36 so that the longitudinal direction of the first case 62 is along a front and rear direction of the diesel engine 5.

In addition, a supercharger 71 that forcibly sends air into the diesel engine 5 is disposed at an exhaust gas outlet of the exhaust manifold 36. The DPF inlet pipe 68 communicates to the exhaust manifold 36 via the supercharger 71, and the exhaust gas from the diesel engine 5 is introduced from the DPF inlet pipe 68 into the first case 62. On the other hand, a DPF outlet pipe 72 for discharging the exhaust gas is disposed on the other end side of the cylindrical first case 62. An inlet side of a urea mixing pipe 73 is connected to the DPF outlet pipe 72 of the first case 62, and the exhaust gas from the first case 28 is introduced into the urea mixing pipe 73.

On the other hand, the second case 63 is formed in a vertical cylindrical shape elongated in an up and down direction. An SCR inlet pipe 74 for taking in the exhaust gas is disposed on the lower end side of the cylindrical second case 63. The SCR inlet pipe 74 is connected to an outlet side of the urea mixing pipe 73 via a bellows connection pipe 75 that can be bent, compressed, and extended. Further, an end of the urea mixing pipe 73 connected to the bellows connection pipe 75 is fixed to the side surface of the cylinder block 35 via a pipe bracket 76 in an attachable and detachable manner. In other words, the urea mixing pipe 73 is fixed to the diesel engine 5 via the first case 62 and the pipe bracket 76, and hence the first case 62 and the urea mixing pipe 73 can be integrally fixed to the diesel engine 5 that is supported in a vibration isolation manner. A mechanical vibration on the urea mixing pipe 73 side is insulated by the bellows connection pipe 75 and is not transmitted to the SCR inlet pipe 74 side.

Figure 6:
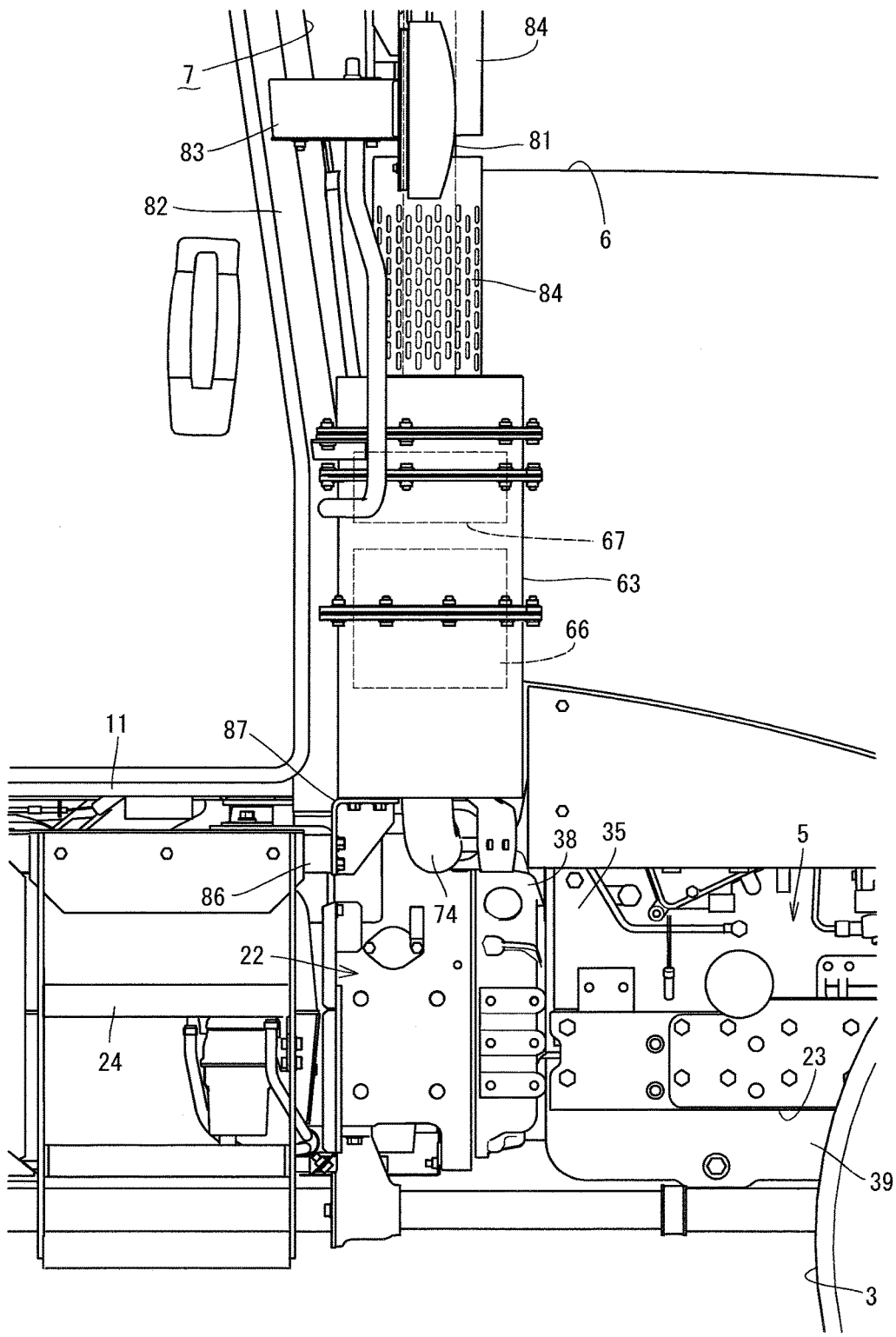
FIG. 6 is a right side view of an exhaust gas purification device.

In addition, as shown in FIG. 6, a lower end side of a tail pipe 81 is connected to an upper end side of the cylindrical second case 63. The tail pipe 81 is disposed to stand substantially vertically along a cabin frame 82 in the right side corner part of the driver cabin 7. The tail pipe 81 and a pipe cover 84 are fixed to the cabin frame 82 via a pipe attachment bracket 83, and an upper end side of the cylindrical second case 63 is fixed to the cabin frame 82 via a case attachment bracket 85 in an attachable and detachable manner.

On the other hand, a step frame 86 is fixed to a side surface of the clutch case 22, while the driver cabin 7, the up/down steps 24 and the like are attached to the step frame 86. In addition, a lower end surface of the cylindrical second case 63 is fastened with bolts to the step frame 86 via a case stand 87 in an attachable and detachable manner. In other words, a back surface side of the case stand 87 is fastened with bolts to a front surface side of the step frame 86, the lower end surface of the cylindrical second case 63 contacts with an upper surface side of the case stand 87, the second case 63 is placed on the case stand 87, and the step frame 86 supports the second case 63. Accordingly, the first case 62 is disposed horizontally (in a horizontally elongated shape) in the front and rear direction on the upper surface side of the diesel engine 5, while the second case 63 is supported in a vertically elongated manner by the rear right side of the diesel engine 5 via the step frame 86. Thus, an exhaust gas moving path of the diesel engine 5 can be functionally formed, while the first case 62 and the second case 63 can be compactly disposed around the engine hood 6 and the driver cabin 7.

Further, a urea water tank 91 is mounted on the traveling machine body 2 (clutch case 22) at a rear part of the engine hood 6. A fuel filler inlet 92 of the fuel tank 12 is disposed at a left front lower part of the cabin 7, and a water filler inlet 93 of the urea water tank 91 is disposed at a rear upper surface part of the engine hood 6. The fuel filler inlet 92 and the water filler inlet 93 are disposed on the left side front surface of a cabin 57 through which the operator often gets in and out, and the urea mixing pipe 73 is supported to extend in the right and left direction in a rear part of the diesel engine 5 (between the diesel engine 5 and the urea water tank 91) inside the engine room formed by the engine hood 6. In addition, because the urea water tank 91 is disposed between the front part of the front column 10 and the rear part of the diesel engine 5, heat or vibration generated on the diesel engine 5 side is absorbed by the urea water tank 91 and is prevented from propagating to the front column 10 side. In addition, the urea water tank 91 is heated by heat of the diesel engine 5 side, and hence temperature of urea water solution in the urea water tank 91 can be easily sustained so that crystallization of the urea water can be reduced even if the work is performed in a cold. Further, a space for disposing a partition member (a space for thermal insulation or a space for vibration isolation and sound insulation) is formed between the front column 10 and the diesel engine 5, the dead space is effectively utilized so that the urea water tank 91 can be compactly disposed in the machine body (engine room).

In addition, there are disposed a urea water injection pump 94 that presses and sends the urea water solution in the urea water tank 91, an electric motor 95 that drives the urea water injection pump 94, and a urea water injection nozzle 97 connected to the urea water injection pump 94 via a urea water injection pipe 96. The urea water injection nozzle 97 is attached to the urea mixing pipe 73 via an injection stand 98, and the urea water solution is sprayed from the urea water injection nozzle 97 into the urea mixing pipe 73. The urea water supplied into the urea mixing pipe 73 is mixed as ammonia with the exhaust gas moving from the first case 62 to the second case 63.

Further, the bellows connection pipe 75 is covered with a heat resisting and insulating material 99 such as glass fiber so that exhaust gas temperature in the bellows connection pipe 75 is prevented from decreasing, and hence crystallization of urea in the exhaust gas is suppressed. In addition, the urea mixing pipe 73 includes an elbow pipe part for changing the exhaust gas moving direction by approximately 90 degrees and an elongated cylindrical straight pipe part for connecting to the SCR inlet pipe 74. The injection stand 98 is welded and fixed to the elbow pipe part at a vicinity of a joint part between the elbow pipe part and the straight pipe part, and the urea water injection nozzle 97 sprays the urea water solution from the elbow pipe part side toward an inner hole of the straight pipe part. Because the urea mixing pipe 73 is disposed in a space between the rear part of the diesel engine 5 and the front part of the urea water tank 91, the urea mixing pipe 73 is heated by heat of the diesel engine 5 side, a temperature decrease of the exhaust gas (urea water solution) in the urea mixing pipe 73 can be suppressed, and hence crystallization of the urea water in the urea mixing pipe 73 can be reduced.

With the structure described above, carbon monoxide (CO) and hydrocarbon (HC) in the exhaust gas from the diesel engine 5 is reduced by the oxidation catalyst 64 and the soot filter 65 in the first case 62. Next, the urea water from the urea water injection nozzle 97 is mixed with the exhaust gas from the diesel engine 5 in the urea mixing pipe 73. Then, the SCR catalyst 66 and the oxidation catalyst 67 in the second case 63 reduce nitrogen oxides (NOx) in the exhaust gas mixed with the urea water as ammonia. In other words, the exhaust gas after carbon monoxide (CO), hydrocarbon (HC), and nitrogen oxides (NOx) are reduced is discharged from the tail pipe 81 to the outside of the machine.

As shown in FIGS. 1 to 6, the work vehicle is equipped with the driver cabin 7 as the operation unit for the operator to get in, the first case 62 for removing particulate matter in the exhaust gas from the diesel engine 5, the second case 63 for removing nitrogen oxides in the exhaust gas from the diesel engine 5, the step frame 86 as the traveling machine body frame on which the operation unit 7 is mounted, and the case stand 87 as the case support body for supporting the second case 63. In this structure, the case stand 87 is disposed on the step frame 86, and the second case 63 is attached to the step frame 86 via the case stand 87. Accordingly the case stand 87 can be disposed on the step frame 86 having high stiffness, and hence manufacturing cost can be easily reduced by downsizing and simplifying the case stand 87. In addition, support stiffness of the second case 63 can be easily improved, and workability of assembling the second case 63 can be also easily improved. In addition, compared with a conventional structure in which the exhaust gas pipe is used for supporting the second case 63, the support structure of the second case 63 can be easily simplified.

As shown in FIGS. 1 to 6, the operation unit for an operator to get in is constituted as the driver cabin 7, and the driver cabin 7 is disposed on the step frame 86. In this structure, the lower part of the second case 63 in the vertically elongated state is attached to the step frame 86 via the case stand 87, and the upper part of the vertically elongated second case is connected to the cabin frame 82 as the front corner frame of the driver cabin 7. Accordingly, the lower part of the second case 63 can be placed and fixed to the case stand 87, and hence workability of assembling the relatively heavy second case 63 can be improved. In addition, because the cabin frame 82 of the driver cabin 7 is connected to the upper part of the second case 63, lateral swing of the second case 63 can be easily prevented. Thus, the outer shape of the second case 63 can be compactly formed to be the vertically elongated cylindrical shape that can be along the cabin frame 82 of the driver cabin 7.

As shown in FIGS. 1 to 6, the driver cabin 7 is disposed behind the engine hood 6 in which the diesel engine 5 is disposed, the urea water tank for purifying the exhaust gas 91 and the urea mixing pipe 73 for supplying the urea water from the urea water tank 91 are provided, and the exhaust gas inlet of the second case 63 is connected to the exhaust gas outlet of the first case 62 via the urea mixing pipe 73. In this structure, the urea water tank 91 is disposed between the steering wheel 9 of the driver cabin 7 and the diesel engine 5. Accordingly, heat or vibration generated on the diesel engine 5 side can be prevented from propagating to the driver cabin 7 side. In addition, the urea water tank 91 is heated by heat of the diesel engine 5 side, and hence temperature of urea water solution in the urea water tank 91 can be easily sustained so that crystallization of the urea water can be reduced even if the work is performed in a cold. Further, because it is necessary to separate the driver cabin 7 from the diesel engine 5, the urea water tank 91 can be effectively utilized as the partition member. Thus, a separation structure between the driver cabin 7 and the diesel engine 5 can be simplified, and the urea water tank 91 can be compactly disposed inside the engine hood 6 (engine room).

As shown in FIGS. 1 to 6, the urea mixing pipe 73 is disposed to extend in a direction crossing the exhaust gas moving direction of the first case 62 between the rear part of the diesel engine 5 and the front part of the urea water tank 91. Accordingly, the urea mixing pipe 73 can be compactly disposed between the rear part of the diesel engine 5 and the front part of the urea water tank 91. In addition, because the urea mixing pipe 73 is heated by heat of the diesel engine 5 side, temperature of urea water solution in the urea mixing pipe 73 can be easily sustained so that crystallization of the urea water in the urea mixing pipe 73 can be reduced even if the work is performed in a cold.

Figure 7:
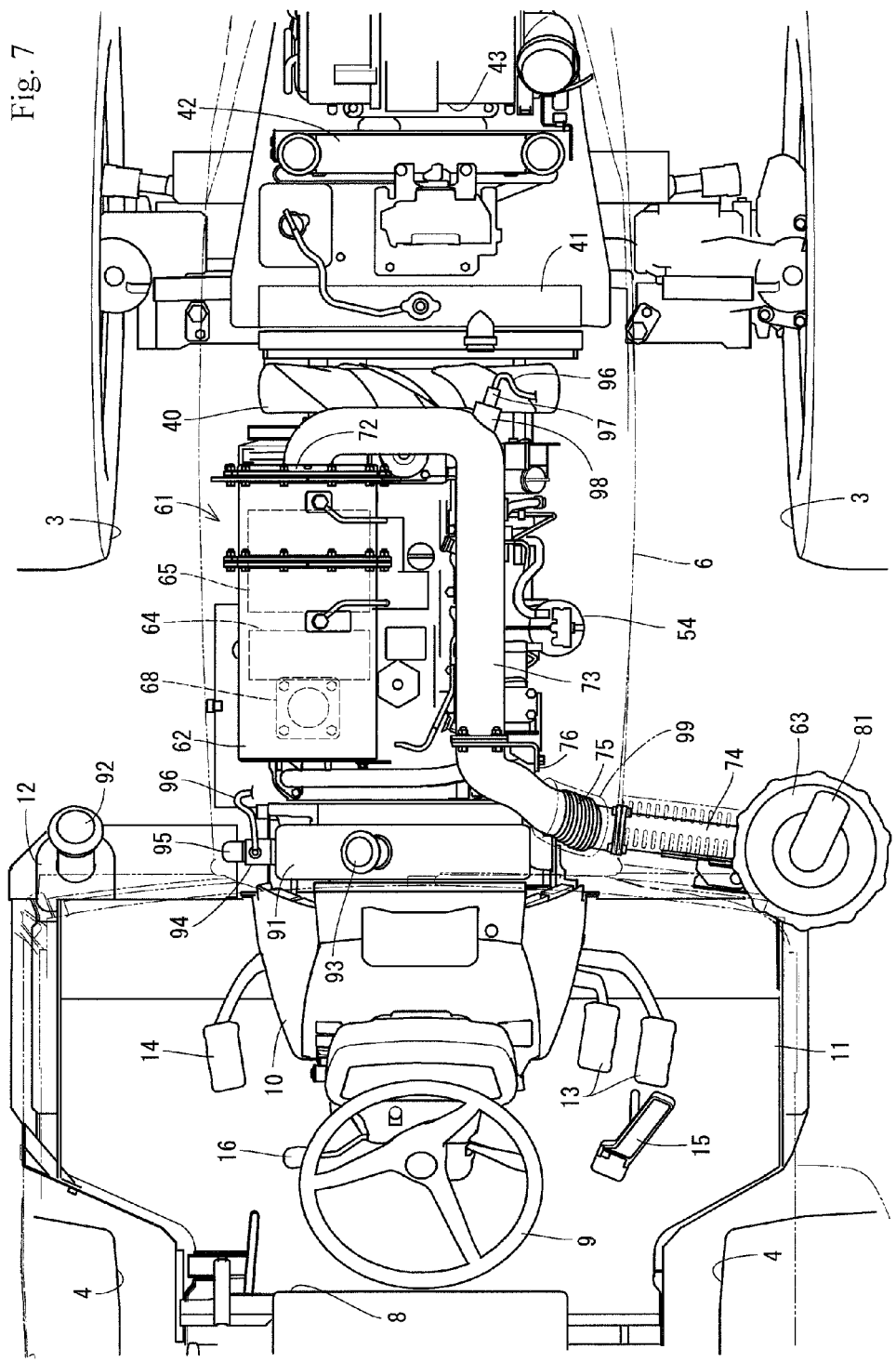
FIG. 7 is a plan view of the engine portion showing a second embodiment.
Figure 8:
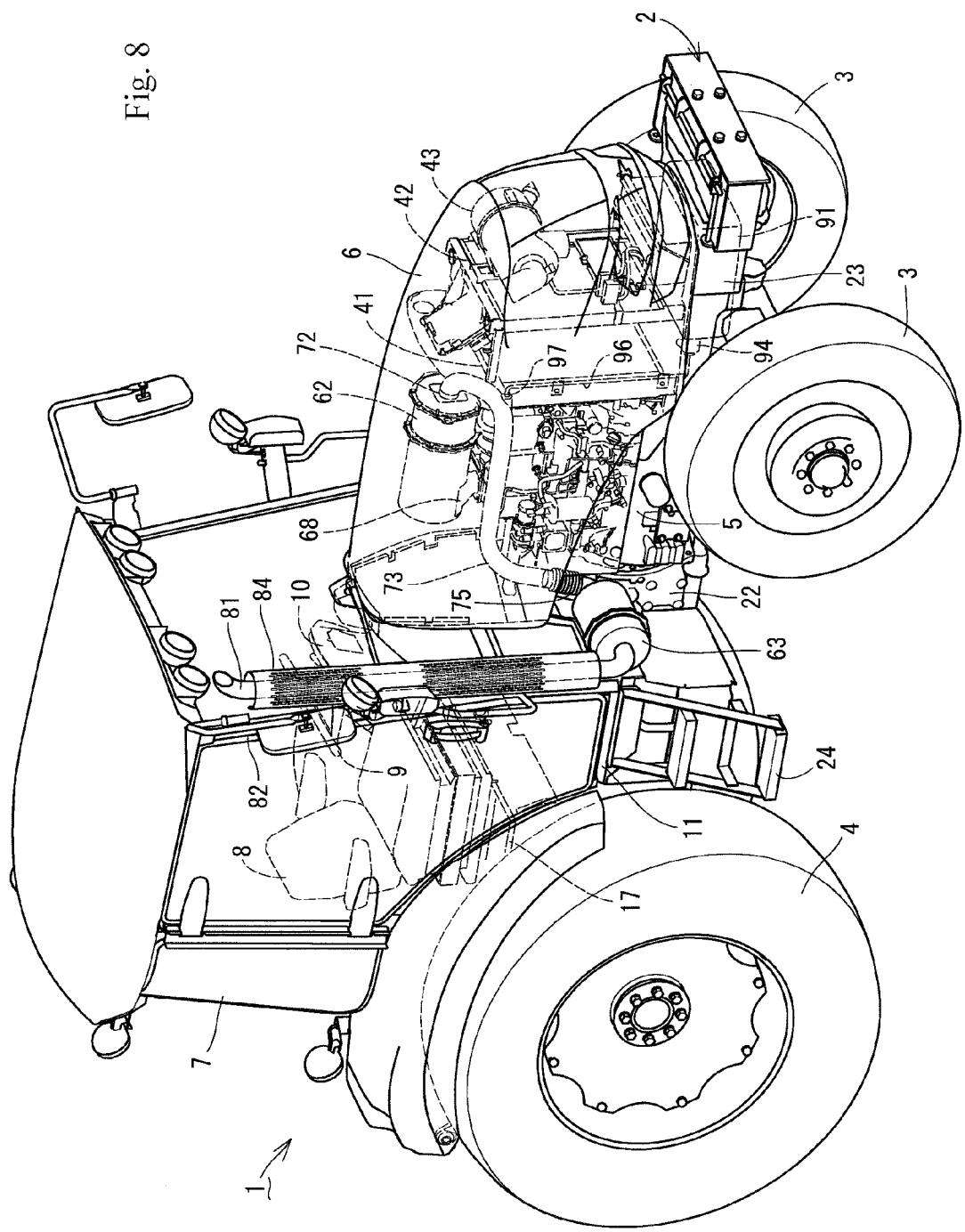
FIG. 8 is a perspective view of a showing a third embodiment.
Figure 9:
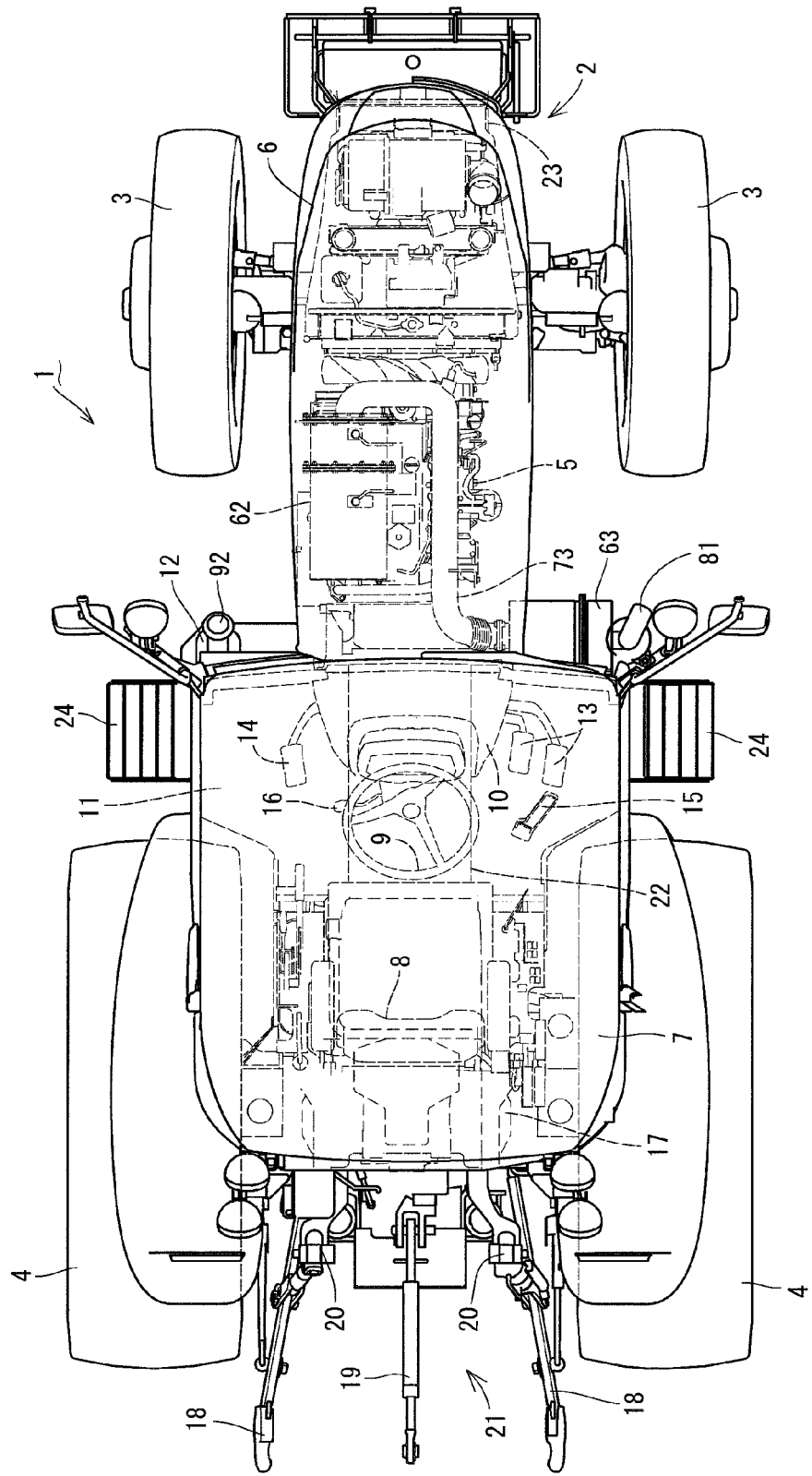
FIG. 9 is a plan view of the tractor.

Next, with reference to FIG. 7, a structure of the exhaust gas purification device 61 according to a second embodiment is described. In the exhaust gas purification device 61 of the first embodiment shown in FIG. 3, the DPF inlet pipe 68 is disposed on the front of the diesel engine 5, the exhaust gas moves from the front part to the rear part of the first case 62, and the exhaust gas moves to the urea mixing pipe 73 in the rear part of the diesel engine 5. In contrast, in the exhaust gas purification device 61 of the second embodiment shown in FIG. 7, the DPF inlet pipe 68 is disposed on the rear side of the diesel engine 5, the exhaust gas moves from the rear part to the front part of the first case 62, and the exhaust gas moves to the urea mixing pipe 73 disposed in the upper part of the diesel engine 5 in parallel to the first case 62. In other words, the urea mixing pipe 73 is supported to extend in the front and rear direction via the pipe bracket 76 in parallel to the first case 62 on the upper surface side of the diesel engine 5.

As shown in FIG. 7, the urea mixing pipe 73 is disposed to extend in parallel to the first case 28 disposed to extend in the front and rear direction on the upper surface side of the diesel engine 1, the urea water injection nozzle 97 is attached to the front part of the urea mixing pipe 73 disposed at a higher position than the cooling fan 24 via the injection stand 98, and the urea water solution is sprayed from the urea water injection nozzle 97 into the inside of the urea mixing pipe 73. Compared with a length of the urea mixing pipe 73 disposed in the right and left direction of the diesel engine 1 of the first embodiment shown in FIG. 3, the embodiment shown in FIG. 7 enables to form a long distance in which the urea water supplied into the urea mixing pipe 73 is mixed with the exhaust gas as ammonia. Accordingly, in the embodiment shown in FIG. 7, the urea water in the urea mixing pipe 73 can be appropriately mixed as ammonia with the exhaust gas while moving from the first case 62 to the second case 63. In addition, the urea mixing pipe 73 is heated by heat of the diesel engine 5 side so that a temperature decrease of the exhaust gas (urea water solution) in the urea mixing pipe 73 can be suppressed, and hence crystallization of the urea water in the urea mixing pipe 73 can be reduced.

As shown in FIG. 7, the urea water tank for purifying the exhaust gas 91 and the urea mixing pipe 73 for supplying the urea water from the urea water tank 91 are provided, and the exhaust gas inlet of the second case 63 is connected to the exhaust gas outlet of the first case 62 via the urea mixing pipe 73. In this structure, the first case 62 is supported by the upper part of the diesel engine 5, and the urea mixing pipe 73 is disposed to extend in parallel to the exhaust gas moving direction of the first case 62. Accordingly, the urea mixing pipe 73 is heated by heat of the diesel engine 5 or the first case 62 side so that crystallization of the urea water in the urea mixing pipe 73 can be reduced. In addition, a length of a heated part of the urea mixing pipe 73 heated by heat of the diesel engine 5 can be equal to or longer than the length necessary for mixing the urea water as ammonia with the exhaust gas, so that an exhaust gas purifying function of removing nitrogen oxides in the exhaust gas in the second case 63 can be improved.

Figure 10:
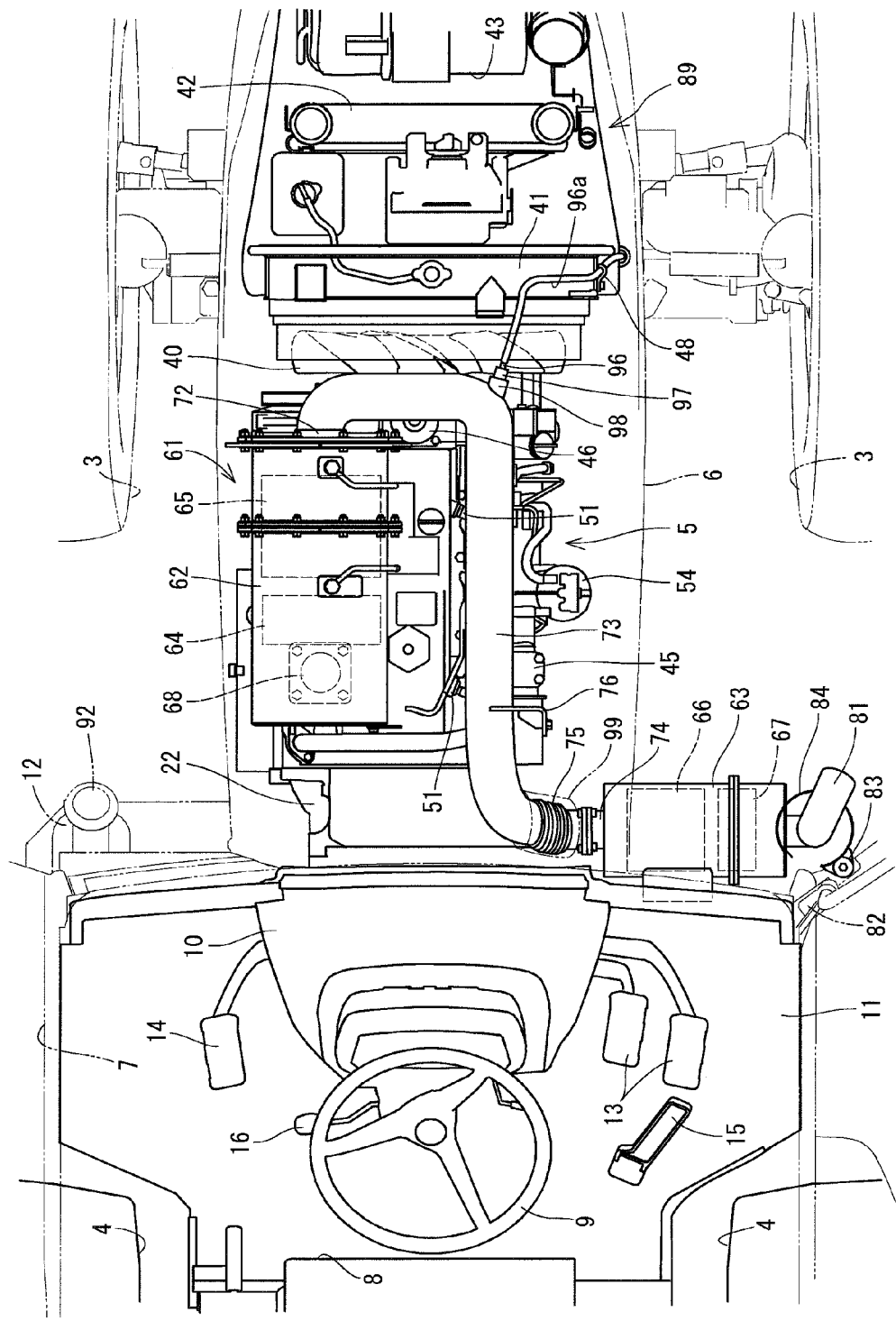
FIG. 10 is a plan view of an engine portion.

Next, with reference to FIGS. 8 to 13, a third embodiment is described. As shown in FIGS. 8 to 13, as the exhaust gas purification device 61 for purifying the exhaust gas discharged from each cylinder of the diesel engine 5, the first case 62 as the diesel particulate filter (DPF) for removing particulate matter in the exhaust gas from the diesel engine 5 and the second case 63 as the urea selective catalyst reduction (SCR) system for removing nitrogen oxides in the exhaust gas from the diesel engine 5 are provided. As shown in FIG. 10, the oxidation catalyst 64 and the soot filter 65 are disposed in the first case 62. The SCR catalyst 66 and the oxidation catalyst 67 for urea selective catalyst reduction are disposed in the second case 63.

The second case 63 of the third embodiment is formed in a horizontally elongated cylindrical shape extending in the right and left direction. The SCR inlet pipe 74 for taking in the exhaust gas is disposed in a left end part of the cylindrical second case 63. The SCR inlet pipe 74 is connected to an outlet side of the urea mixing pipe 73 via the bellows connection pipe 75 that can be bent, compressed, and extended. In addition, an end part of the urea mixing pipe 73 connected to the bellows connection pipe 75 is fixed to the side surface of the cylinder block 35 via the pipe bracket 76 in an attachable and detachable manner.

Further, the DPF inlet pipe 68 is positioned on the rear side of the diesel engine 5, the exhaust gas moves from the rear part of the first case 62 to the front part, and the exhaust gas moves to the urea mixing pipe 73 disposed in the upper part of the diesel engine 5 in parallel to the first case 62. In other words, the urea mixing pipe 73 extending in the front and rear direction is fixed to the upper surface side of the diesel engine 5 via the first case 62 and the pipe bracket 76, the urea mixing pipe 73 is disposed in parallel to the first case 62 on a side of the first case 62 on the upper surface of the diesel engine 5, and the first case 62 and the urea mixing pipe 73 can be integrally fixed to the diesel engine 5 that is supported in a vibration isolation manner. The mechanical vibration on the urea mixing pipe 73 side is isolated by the bellows connection pipe 75 and is not transmitted to the SCR inlet pipe 74 side.

Figure 13:
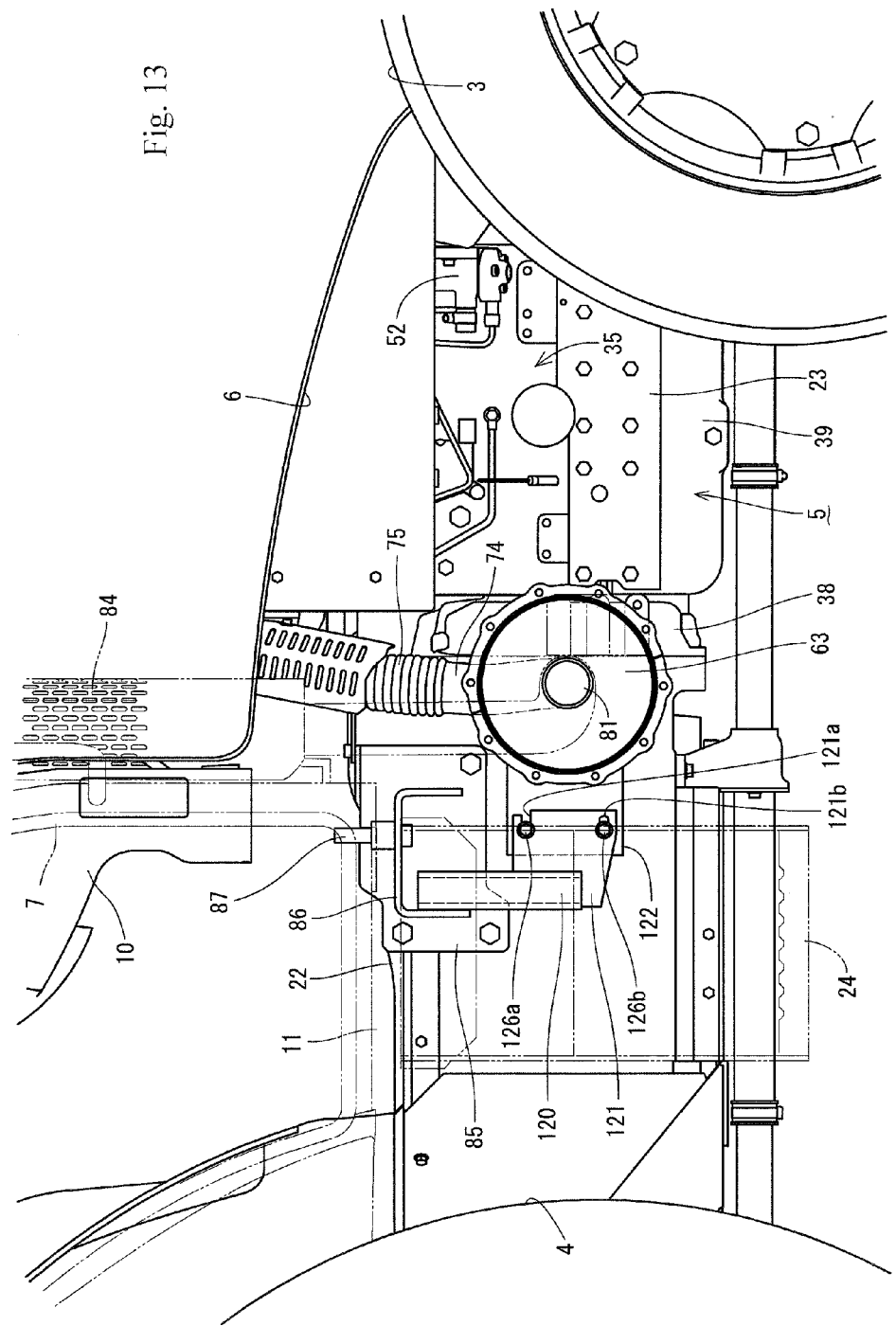
FIG. 13 is a right side view of a second case attaching part.

In addition, as shown in FIG. 13, a right end part of the cylindrical second case 63 is connected to a lower end side of the tail pipe 81. The tail pipe 81 is disposed to stand substantially vertically along the cabin frame 82 in the right side corner part of the driver cabin 7. The tail pipe 81 and the pipe cover 84 are fixed to the cabin frame 82 via the pipe attachment bracket 83. On the other hand, proximal end sides of the right and left step frames 86 as the traveling machine body frame are fastened with bolts to the right and left side surfaces of the clutch case 22 via the substrate brackets 85, distal end sides of the right and left step frames 86 are disposed to extend horizontally to right and left outside of the clutch case 22, the driver cabin 7 is attached to the upper surface side of an intermediate part of the right and left step frames 86 via a cabin fixing shaft 87, and the up/down steps 24 are attached to distal end parts of the right and left step frames 86.

Further, as shown in FIG. 13, the step frame 86 supports the second case 63, a support post member 120 is welded and fixed to a lower surface side of the step frame 86, a pair of right and left case support plates 121 is welded and fixed to a front surface side of the support post member 120, the case support plates 121 are integrally fixed to the step frame 86, and the pair of right and left case support plates 121 are disposed to protrude frontward from the support post member 120. A case support bracket 122 is integrally welded and fixed to a back surface side of the second case 63 in the outer circumference surface of the second case 63 for purifying the exhaust gas, and the case support bracket 122 is disposed to protrude backward from the second case 63. The case support bracket 122 is engaged and fixed to between the pair of right and left case support plates 121, an upper bolt 126*a* and a lower bolt 126*b* are engaged with the pair of right and left case support plates 121 and right and left side surfaces of the case support bracket 122 from the right and left direction, the case support bracket 122 is fastened to the case support plate 121, and the second case 63 is fixed to the step frame 86 in an attachable and detachable manner.

In addition, the upper bolt 126*a* is engaged with an engaging notch 121*a* having a frontward opening shape of the case support plate 121 in a detachable manner, and the lower bolt 126*b* is made to penetrate a position adjustment long hole 121*b* of the case support plate 121. In other words, when the second case 63 is assembled, the upper bolt 126*a* is temporarily fastened to the case support bracket 122 first, the second case 63 is disposed close to the attachment position of the case support plate 121, the upper bolt 126*a* is engaged with the engaging notch 121*a* of the case support plate 121, and the second case 63 is temporarily supported by the case support plate 121. After that, the lower bolt 126*b* is made to penetrate the position adjustment long hole 121*b* of the case support plate 121, the lower bolt 126*b* is fastened to the case support bracket 122, the upper bolt 126*a* is fastened to the case support bracket 122, the case support bracket 122 is fastened to the case support plates 121 via the bolts 126*a* and 126*b* in an attachable and detachable manner, and the second case 63 is mounted to the front surface side of the cabin 57 (operation unit) via the step frame 86. Accordingly, the first case 28 is disposed in a laterally elongated horizontal posture facing in the front and rear direction on the upper surface side of the diesel engine 1. On the other hand, the second case 63 is disposed in a horizontally elongated shape facing in the right and left direction on the rear right side of the diesel engine 1.

Figure 11:
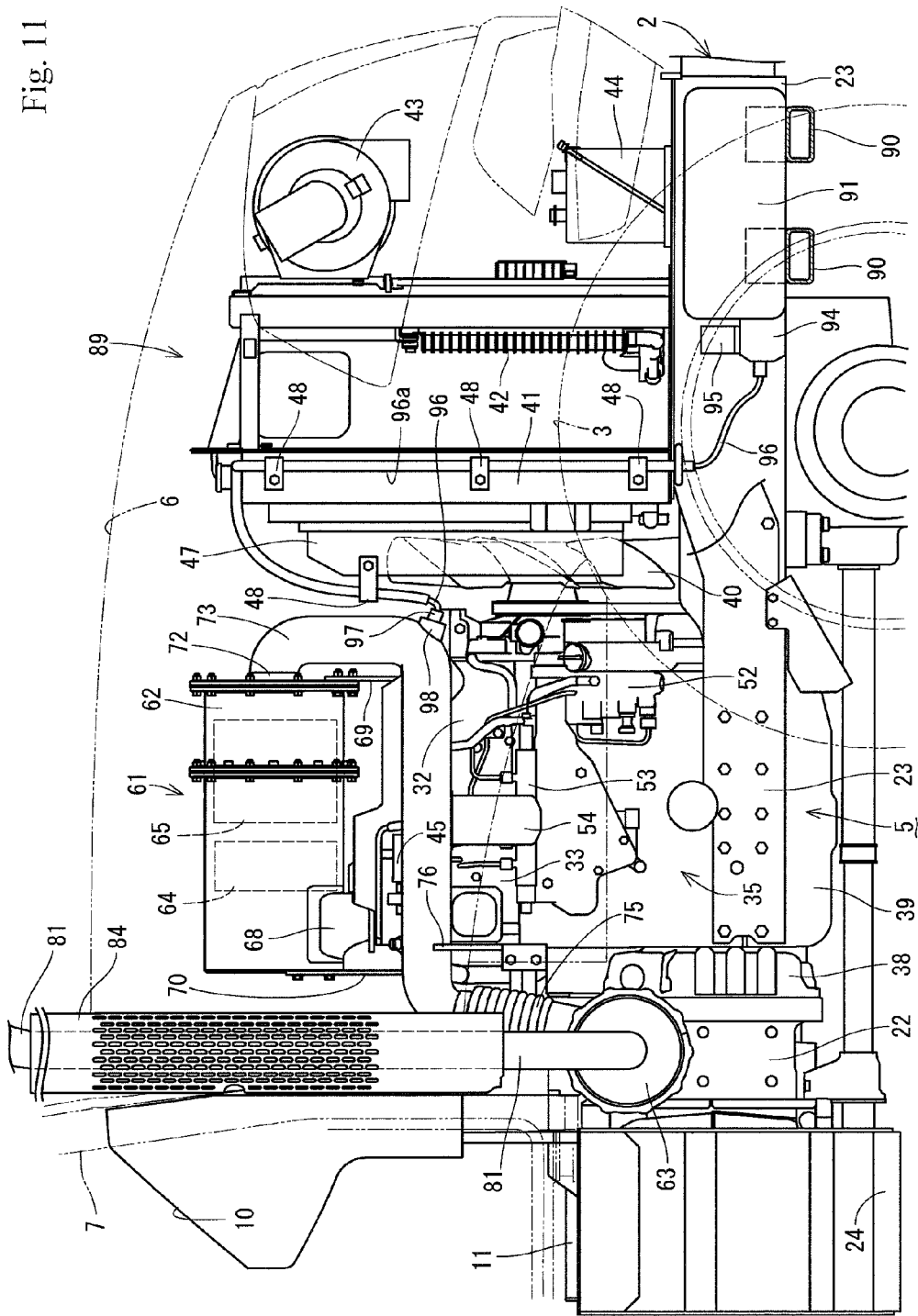
FIG. 11 is a right side view of the engine portion.
Figure 12:
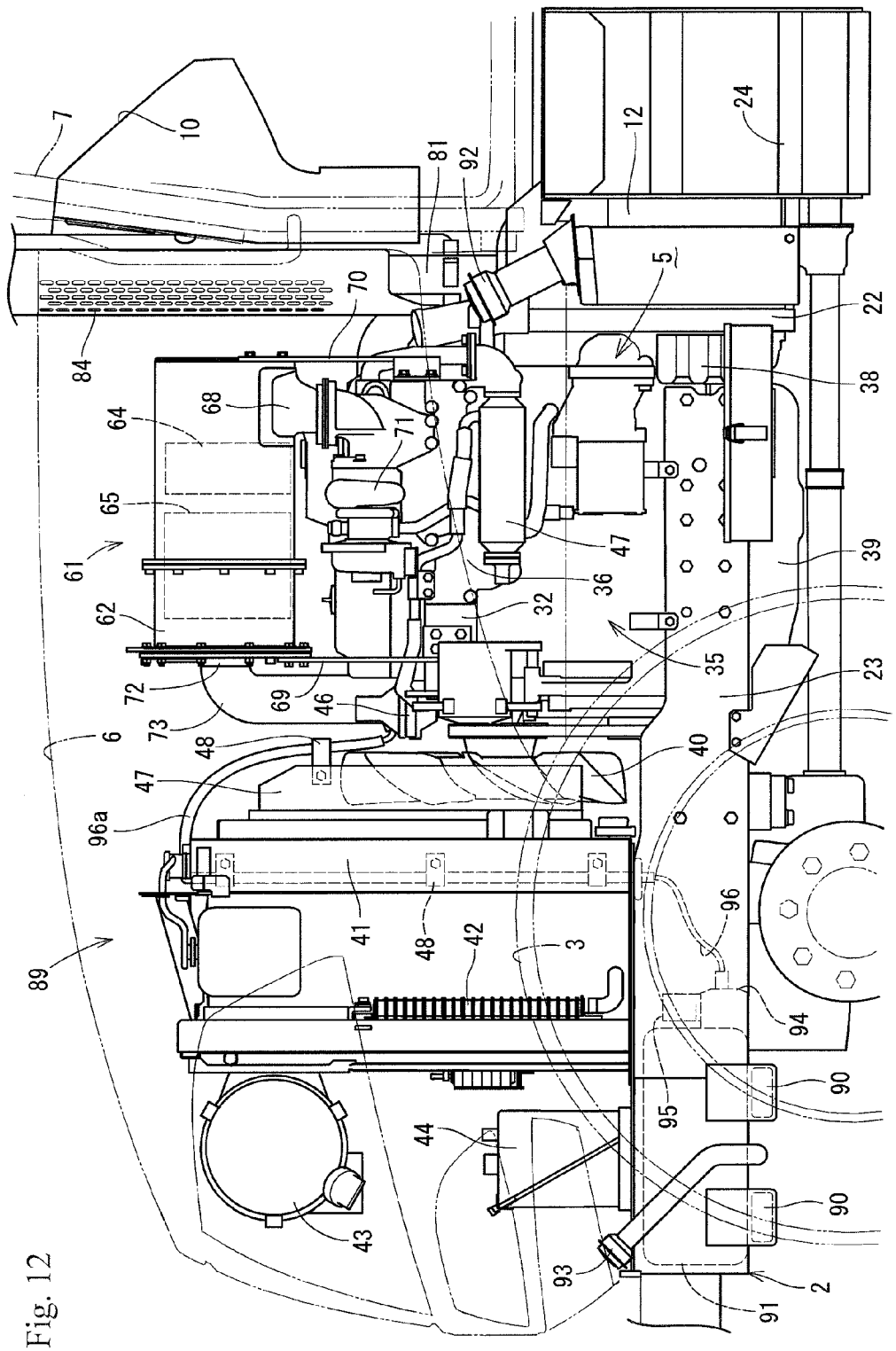
FIG. 12 is a left side view of the engine portion.

Further, as shown in FIGS. 11 and 12, the urea water tank 91 is mounted to the traveling machine body 2 (front chassis 23) in a front part of the engine hood 6. The fuel filler inlet 92 of the fuel tank 12 is disposed in the left front lower part of the cabin 7, and the water filler inlet 93 of the urea water tank 91 is disposed in the left side part of the front part of the engine hood 6. The fuel filler inlet 92 and the water filler inlet 93 are disposed on the left side of the traveling machine body 2 through which the operator often gets in and out, and the urea water tank 91 is disposed between the right and left front chassis 23 via a tank support frame 90. The oil cooler 42, the air cleaner 43, and the battery 44 are disposed above the urea water tank 91 (in an engine room 89 formed by the engine hood 6) on the upper surface side of the front chassis 23.

In addition, the radiator 41 is disposed between the cooling fan 40 and the oil cooler 42 on the front surface side of the diesel engine 5 on the upper surface side of the front chassis 23, and the urea mixing pipe 73 is supported to extend in the front and rear direction on the upper surface side of the diesel engine 5 (on the right side of the second case in which the exhaust gas moves from the rear part to the front part) in the engine room 89 formed by the engine hood 6.

Further, the urea water injection pump 94 for pressing and sending the urea water solution in the urea water tank 91, there are provided the electric motor 95 for driving the urea water injection pump 94, and the urea water injection nozzle 97 for connecting to the urea water injection pump 94 via the urea water injection pipe 96. The urea water injection pump 94 and the electric motor 95 are disposed on a rear surface side of the urea water tank 91, and an intermediate part of the urea water injection pipe 96 is covered with a heat insulating pipe cover 96*a*. The pipe cover 96*a* is fixed and supported by a right side surface of a shroud 47 and a right side surface of the radiator 41 via a pipe stop 48, and the urea water injection pipe 96 extends from the right side surface of the radiator 41 to the urea mixing pipe 73. Note that the shroud 47 is disposed on a rear surface side of the radiator 41 so that the outside of the cooling fan 40 is covered with the shroud 47, and air flow from the cooling fan 40 moves from the radiator 41 to a periphery of the diesel engine 5.

In addition, the urea water injection nozzle 97 is attached via the injection stand 98 to a front end part of the urea mixing pipe 73 connected to the front surface side of the first case 62. One end side of the urea water injection pipe 96 is connected to the urea water injection pump 94, the other end side of the urea water injection pipe 96 is connected to the urea water injection nozzle 97, and the urea water solution in the urea water tank 91 is sprayed from the urea water injection nozzle 97 into the urea mixing pipe 73. The urea water supplied into the urea mixing pipe 73 is mixed as ammonia with the exhaust gas moving from the first case 62 to the second case 63.

Note that the bellows connection pipe 75 is covered with the heat resisting and insulating material 99 such as glass fiber so that a temperature decrease of the exhaust gas in the bellows connection pipe 75 is prevented, and hence crystallization of the urea in the exhaust gas is suppressed. In addition, the urea mixing pipe 73 includes the elbow pipe part for changing the exhaust gas moving direction by approximately 90 degrees, and the elongated cylindrical straight pipe part for connecting to the SCR inlet pipe 74. The injection stand 98 is welded and fixed to the elbow pipe part adjacent to a junction between the elbow pipe part and the straight pipe part, and the urea water injection nozzle 97 sprays the urea water solution from the elbow pipe part side toward the inner hole of the straight pipe part.

With the structure described above, the carbon monoxide (CO) and hydrocarbon (HC) in the exhaust gas from the diesel engine 5 are reduced by the oxidation catalyst 64 and the soot filter 65 in the first case 62. Next, the urea water from the urea water injection nozzle 97 is mixed with the exhaust gas from the diesel engine 5 inside the urea mixing pipe 73. Then, nitrogen oxides (NOx) in the exhaust gas with the urea water mixed as ammonia is reduced by the SCR catalyst 66 and the oxidation catalyst 67 in the second case 63. In other words, the exhaust gas after carbon monoxide (CO), hydrocarbon (HC), and nitrogen oxides (NOx) are reduced is discharged from the tail pipe 81 to the outside of the machine.

As shown in FIGS. 8 to 13, the work vehicle includes the traveling machine body 2 on which the diesel engine 5 is mounted, the first case 62 for removing particulate matter in the exhaust gas from the engine 5, and the second case 63 for removing nitrogen oxides in the exhaust gas from the diesel engine 5. In this work vehicle, the case support plates 121 as the case support body and the case support bracket 122 are disposed on the step frame 86 on the lower surface side of the driver cabin 7 on one side of the traveling machine body 2 in the lower surface side of the driver cabin 7 as the operation unit mounted on the traveling machine body 2, and the second case 63 is attached in a horizontally elongated shape to the lower surface side of the driver cabin 7 via the case support plates 121 and the case support bracket 122. Accordingly, the case support plates 121 can be disposed on the step frame 86 having high stiffness, manufacturing cost can be easily reduced by downsizing and simplifying the case support plates 121 and the case support bracket 122. In addition, support stiffness of the second case 63 can be easily improved, and workability of assembling of the second case 63 can be also easily improved.

As shown in FIGS. 10 to 13, the second case 63 having a horizontally elongated shape is attached via the case support plates 121 and the case support bracket 122 along the front end side of the boarding step 11 on the lower surface side of the driver cabin 7. Accordingly, the second case 63 can be compactly disposed while securing a front field of vision of the operator in the driver cabin 7. In addition, compared with a conventional structure in which the exhaust gas pipe is used for supporting the second case 63, the support structure of the second case 63 can be easily simplified.

As shown in FIGS. 10 to 12, the urea water tank for purifying the exhaust gas 91, the urea mixing pipe 73 for supplying the urea water from the urea water tank 91 are provided, and the exhaust gas inlet of the second case 63 is connected to the exhaust gas outlet of the first case 62 via the urea mixing pipe 73. In this structure, the first case 62 is supported by the upper surface side of the diesel engine 5, and the urea mixing pipe 73 is disposed to extend in parallel to the exhaust gas moving direction of the first case 62. Accordingly, the elongated urea mixing pipe 73 necessary for mixing the urea water can be compactly disposed on the upper surface part of the engine 5. In addition, the urea mixing pipe 73 is heated by heat of the diesel engine 5 side so that temperature of the exhaust gas or urea water solution in the urea mixing pipe 73 can be easily sustained even if the work is performed in a cold, and hence crystallization of the urea water in the urea mixing pipe 73 can be reduced.

As shown in FIGS. 10 to 12, the front chassis 23 as the right and left engine frames are disposed to extend frontward from the diesel engine 5, and the radiator 41, the front wheels 3, or the like is disposed on the right and left front chassis 23. In this structure, the urea water tank 91 is attached to between the right and left front chassis 23. Accordingly, the urea water tank 91 can be easily assembled by utilizing a space between the right and the left front chassis 23, and the urea water tank 91 can be compactly disposed in the engine hood 6 (engine room 89) for covering the diesel engine 5.

Figure 14:
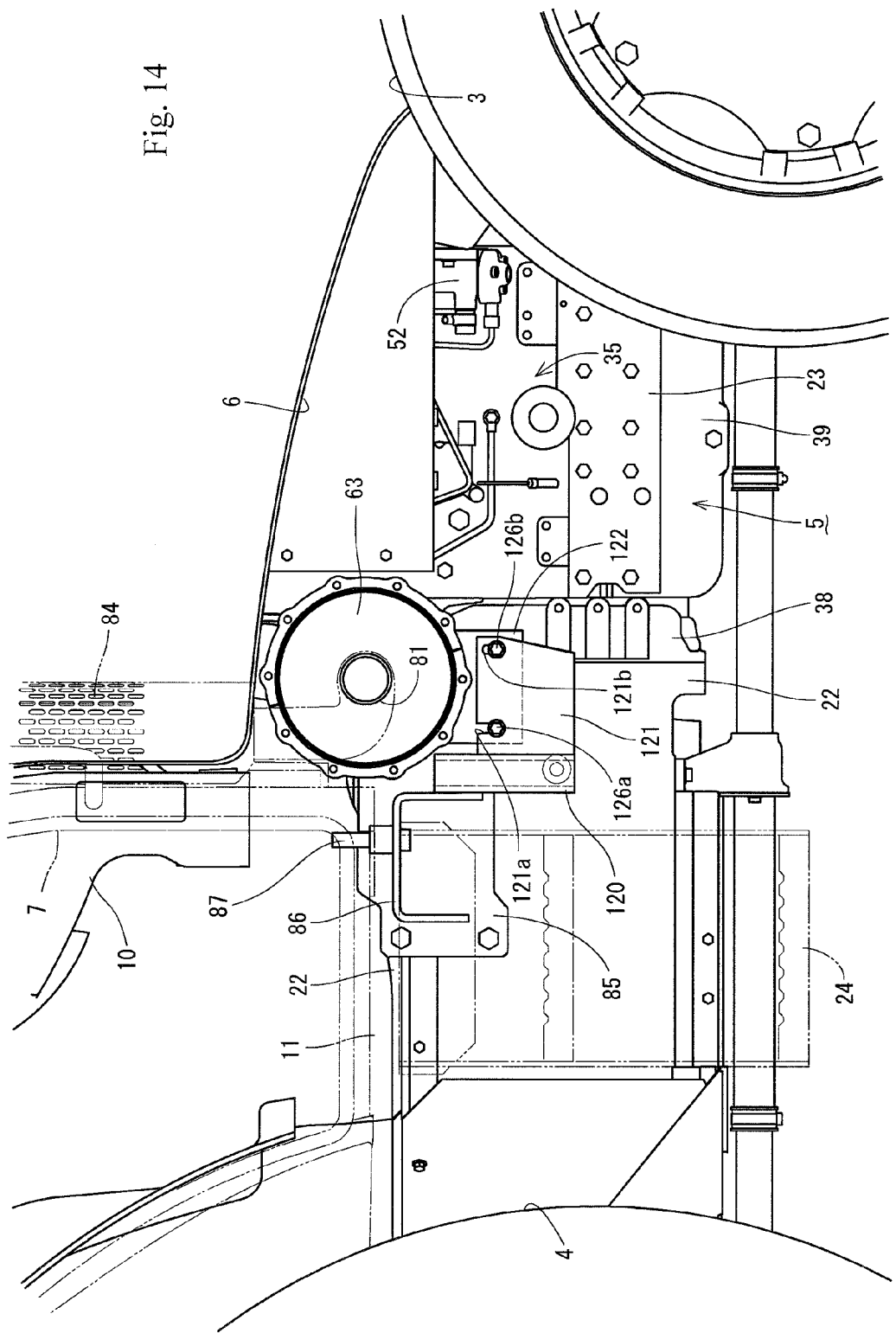
FIG. 14 is a plan view of the second case attaching part showing a fourth embodiment.

Next, with reference to FIG. 14, the exhaust gas purification device 61 of a fourth embodiment (a mounting structure of the second case 63) is described. As shown in FIG. 14, the second case 63 is supported by the step frame 86, the support post member 120 is welded and fixed to the front surface side of the step frame 86, the pair of right and left case support plates 121 is welded and fixed to the front surface side of the support post member 120, the case support plates 121 is integrally fixed to the step frame 86, and the pair of right and left case support plates 121 is disposed to protrude frontward from the support post member 120. The case support bracket 122 is integrally welded and fixed to the lower surface side of the second case 63 in the outer circumference surface of the second case 63 for purifying the exhaust gas, and the case support bracket 122 is disposed to protrude downward from the second case 63. The case support bracket 122 is engaged and fixed to between the pair of right and left case support plates 121, the upper bolt 126a and the lower bolt 126b are engaged with the pair of right and left case support plates 121 and the right and left side surfaces of the case support bracket 122 from the right and left direction, the case support bracket 122 is fastened to the case support plates 121, and the second case 63 is fixed to the step frame 86 in an attachable and detachable manner.

In addition, the upper bolt 126a is engaged with the engaging notch 121a having an upward opening shape of the case support plates 121 in a detachable manner, and the lower bolt 126b penetrates the position adjustment long hole 121b of the case support plates 121. In other words, when the second case 63 is assembled, in the same manner as the first embodiment, the case support bracket 122 is fixed to the case support plates 121 via the bolts 126a and 126b in an attachable and detachable manner, the second case 63 is attached to the front surface side of the cabin 7 (operation unit) via the step frame 86. Accordingly, the second case 63 can be supported at a higher position than in the third embodiment.

Figure 15:
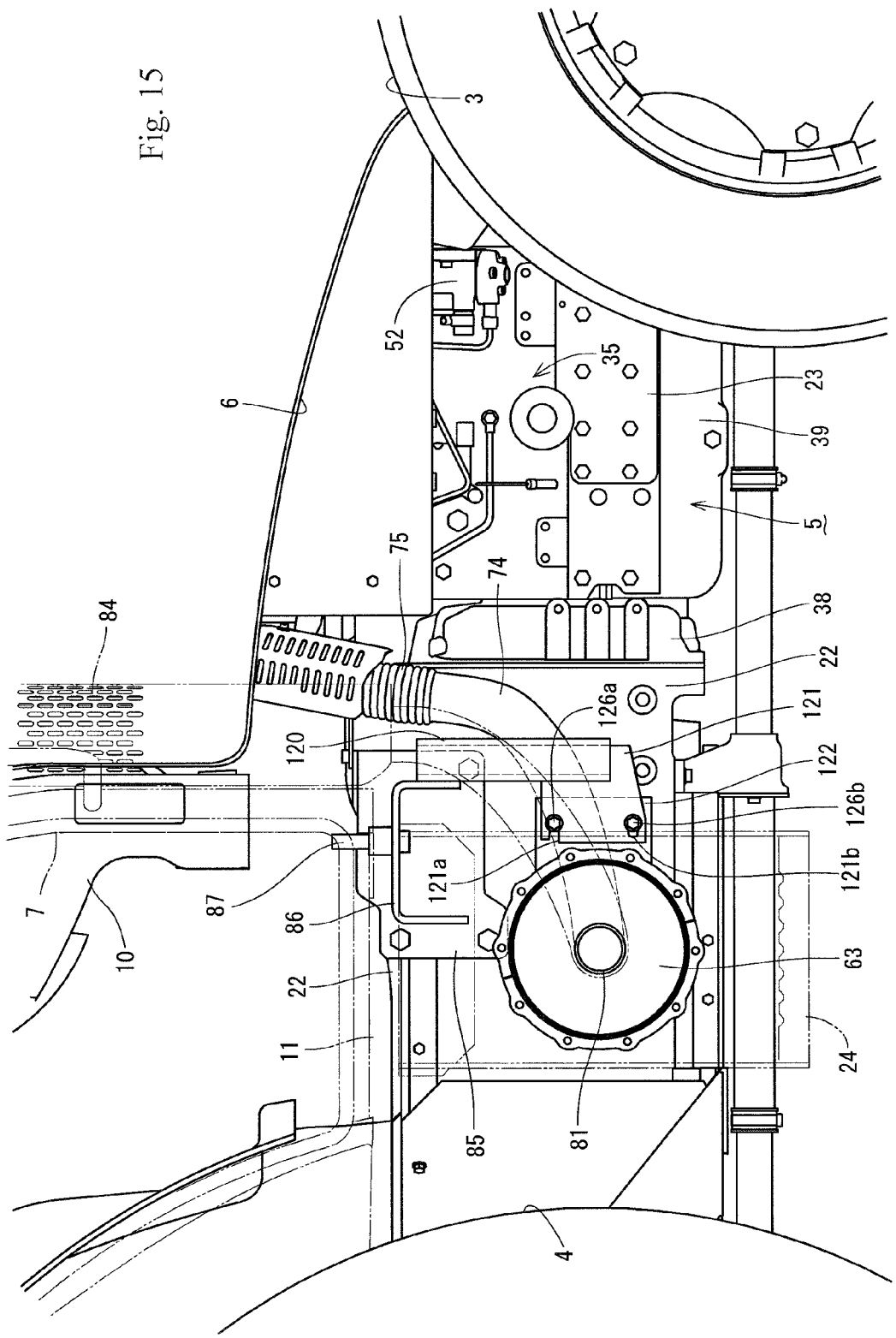
FIG. 15 is a plan view of the second case attaching part showing a fifth embodiment.

Next, with reference to FIG. 15, the exhaust gas purification device 61 of a fifth embodiment (a mounting structure for the second case 63) is described. As shown in FIG. 15, the second case 63 is supported by the step frame 86, the support post member 120 is welded and fixed to the front surface side of the step frame 86, the pair of right and left case support plates 121 is welded and fixed to a rear surface side of the support post member 120, the case support plates 121 is integrally fixed to the step frame 86, and the pair of right and left case support plates 121 is disposed to protrude backward from the support post member 120. The case support bracket 122 is integrally welded and fixed to the front surface side of the second case 63 in the outer circumference surface of the second case 63 for purifying the exhaust gas, and the case support bracket 122 is disposed to protrude frontward from the second case 63. The case support bracket 122 is engaged and fixed to between the pair of right and left case support plates 121, the upper bolt 126a and the lower bolt 126b are engaged with the pair of right and left case support plates 121 and the right and left side surfaces of the case support bracket 122 from the right and left direction, the case support bracket 122 is fastened to the case support plates 121, and the second case 63 is fixed to the step frame 86 in an attachable and detachable manner.

In addition, the upper bolt 126a is engaged with the engaging notch 121a having a backward opening shape of the case support plates 121 in a detachable manner, and the lower bolt 126b penetrates the position adjustment long hole 121b of the case support plates 121. In other words, when the second case 63 is assembled, in the same manner as in the first embodiment, the case support bracket 122 is fixed to the case support plates 121 via the bolts 126a and 126b in an attachable and detachable manner, and the second case 63 is attached to the lower surface side of the step frame 86. Accordingly, the second case 63 can be supported between the right side surface of the clutch case 22 and an inner surface side of the right up/down step 24. Further, the second case 63 is supported in a laterally elongated posture in the right and left direction so that the exhaust gas moving direction of the second case 63 becomes the right and left direction in the fifth embodiment, but it is possible that the second case 63 is supported in a laterally elongated posture in the front and rear direction so that the exhaust gas moving direction of the second case 63 becomes the front and rear direction, and that the second case 63 and the tail pipe 81 are disposed to extend backward on the lower surface side of the boarding step 11.

As shown in FIG. 15, the second case 63 is attached via the case support plates 121 and the case support bracket 122 between the one side surface of the traveling machine body 2 and the up/down steps 24 below the boarding step 11 on the lower surface side of the driver cabin 7. Accordingly, the up/down steps 24 can protect the machine outer side of the second case 63, and the second case 63 can be compactly disposed by utilizing a space between the side surface of the traveling machine body 2 and the up/down steps 24.

EXPLANATION OF NUMERALS 5 diesel engine
6 engine hood
7 driver cabin (operation unit)
9 steering wheel
62 first case
63 second case
73 urea mixing pipe
82 cabin frame (front corner frame)
86 step frame (traveling machine body frame)
87 case stand (case support body)
91 urea water tank
121 case support plates (case support body)
122 case support bracket (case support body)

The invention claimed is:

1. A tractor comprising:
a cabin comprising an operation unit for an operator to get in;
a first case for removing particulate matter in exhaust gas from an engine;
a second case for removing nitrogen oxides in the exhaust gas from the engine; wherein the operation unit is disposed behind a hood which contains the engine;
the tractor further comprising a urea water tank operably connected to a urea mixing pipe for providing urea water from the urea water tank, wherein an exhaust inlet of the second case is connected to an exhaust outlet of the first case via the urea mixing pipe, and wherein inside the hood the first case is supported on an upper portion of the engine so that exhaust gas flows from a first side to a second side of the first case and wherein an exhaust inlet side of the urea mixing pipe is connected to an exhaust outlet of the first case; wherein the second case has a vertically elongated posture, and a lower end side of a tailpipe is connected to an upper end side of the second case; and wherein
the cabin is mounted on a traveling machine body frame;
the tractor further comprising a case support body for supporting the second case, wherein
the case support body is disposed in the traveling machine body frame, and a lower portion of the second case is attached to the traveling machine body frame via the case support body and the second case is disposed proximate a front corner of the cabin and wherein the tail pipe is fixed to the front corner frame of the cabin via a pipe mounting bracket.

2. The tractor according to claim 1, wherein the urea water tank is disposed between a steering wheel portion of the operation unit and the engine.

3. The tractor according to claim 2, wherein the urea mixing pipe is disposed to extend in a direction crossing an exhaust gas moving direction of the first case between a rear part of the engine and a front part of the urea water tank.

4. The tractor according to claim 1, wherein the urea mixing pipe is disposed to extend in parallel to an exhaust gas moving direction of the first case.

5. The tractor according to claim 1, wherein the case support body is disposed on a step frame of an operation unit lower surface side on one side of the traveling machine body in a lower surface side of the operation unit mounted on the traveling machine body, and the second case is attached to the operation unit lower surface side via the case support body in a horizontally elongated shape.

6. The tractor according to claim 5, wherein the second case is attached to the operation unit lower surface side via the case support body in a horizontally elongated shape along a front end side of the boarding step.

7. The tractor according to claim 5, wherein the second case is attached via the case support body between one side surface of the traveling machine body and up/down steps below the boarding step on the operation unit lower surface side.

8. The tractor according to claim 5, wherein the urea mixing pipe is disposed to extend in parallel to an exhaust gas moving direction of the first case.

9. The tractor according to claim 8, wherein right and left engine frames are disposed to extend frontward from the engine, a radiator or front wheels are arranged in the right and left engine frames, and the urea water tank is attached between the right and left engine frames.

10. The tractor according to claim 1, wherein the first case is supported on an upper portion of the engine so that the first side of the first case is closer to the operation unit than the second side of the first case.

11. The tractor according to claim 1, wherein a portion of the first case is directly above the engine.

12. The tractor according to claim 1, wherein the first case is supported via a cylinder head of the engine.

* * * * *